United States Patent
Ricotta et al.

(10) Patent No.: US 11,238,164 B2
(45) Date of Patent: Feb. 1, 2022

(54) SECURE ADAPTIVE DATA STORAGE PLATFORM

(71) Applicant: BurstIQ, Inc., Colorado Springs, CO (US)

(72) Inventors: Frank Ricotta, Colorado Springs, CO (US); Brian Jackson, Parker, CO (US); Tyson Henry, Castle Rock, CO (US)

(73) Assignee: BURSTIQ, INC., Denver, CO (US)

( * ) Notice: Subject to any disclaimer, the term of this patent is extended or adjusted under 35 U.S.C. 154(b) by 186 days.

(21) Appl. No.: 16/031,929

(22) Filed: Jul. 10, 2018

(65) Prior Publication Data

US 2019/0012466 A1 Jan. 10, 2019

Related U.S. Application Data

(60) Provisional application No. 62/530,812, filed on Jul. 10, 2017.

(51) Int. Cl.
```
G06F 21/60      (2013.01)
G06F 21/62      (2013.01)
H04L 9/32       (2006.01)
H04L 29/08      (2006.01)
H04L 29/06      (2006.01)
H04L 9/06       (2006.01)
```

(52) U.S. Cl.
CPC ........ *G06F 21/602* (2013.01); *G06F 21/6218* (2013.01); *H04L 9/065* (2013.01); *H04L 9/3236* (2013.01); *H04L 9/3239* (2013.01); *H04L 63/0457* (2013.01); *H04L 63/102* (2013.01); *H04L 67/10* (2013.01); *H04L 67/1097* (2013.01); *H04L 67/22* (2013.01); *H04L 2209/38* (2013.01)

(58) Field of Classification Search
None
See application file for complete search history.

(56) References Cited

U.S. PATENT DOCUMENTS 7,693,877 B1 * 4/2010 Zasman ............... G06F 16/185
                                                          707/707
8,156,163 B1 * 4/2012 Hamilton ........... H04L 67/1097
                                                          707/812

(Continued)

OTHER PUBLICATIONS

U.S. Appl. No. 62/470,172, filed Mar. 10, 2017 (Year: 2017).*

(Continued)

*Primary Examiner* — Dao Q Ho
(74) *Attorney, Agent, or Firm* — Perkins Coie LLP

(57) ABSTRACT

An adaptive data storage platform includes a plurality of nodes and a plurality of data stores, each associated with a different one of the nodes. An immutable journal distributed is between the plurality of nodes. Access to the data stores is based upon a consensus of trust determined by the plurality of nodes. The data is cyphered as it is received to form ciphered data that is sharded into equally sized shards that are distributed across the nodes for storing on a corresponding ones of the data stores and tracked using the immutable journal. The shard may be periodically sent to a different one of the nodes for storing on the corresponding data store. The data is thereby ciphered and distributed across the plurality of data stores and is not stationary.

16 Claims, 11 Drawing Sheets

(56) References Cited

U.S. PATENT DOCUMENTS

| | | | | |
|---|---|---|---|---|
| 8,266,433 | B1* | 9/2012 | Przykucki | H04L 67/1097 380/286 |
| 8,683,170 | B1* | 3/2014 | Patnaik | H04L 67/1097 711/170 |
| 8,719,923 | B1* | 5/2014 | Miller | H04L 63/062 713/172 |
| 9,363,322 | B1* | 6/2016 | Anton | G06F 16/256 |
| 9,479,585 | B1* | 10/2016 | Jobanputra | G06F 16/188 |
| 9,516,053 | B1* | 12/2016 | Muddu | G06N 5/022 |
| 9,756,552 | B1* | 9/2017 | Pickover | H04W 48/02 |
| 9,935,772 | B1* | 4/2018 | Madisetti | H04L 9/0819 |
| 9,990,367 | B2* | 6/2018 | Bowman | G06F 21/602 |
| 9,996,662 | B1* | 6/2018 | Florissi | G16B 5/00 |
| 10,007,809 | B1* | 6/2018 | Douglis | G06F 21/6218 |
| 10,042,782 | B2* | 8/2018 | Struttmann | G06F 16/9024 |
| 10,073,981 | B2* | 9/2018 | Arasu | G06F 21/6218 |
| 10,075,298 | B2* | 9/2018 | Struttmann | G06F 21/6218 |
| 10,091,180 | B1* | 10/2018 | Moritz | H04L 63/102 |
| 10,091,295 | B1* | 10/2018 | Savic | G06F 16/1827 |
| 10,102,265 | B1* | 10/2018 | Madisetti | G06Q 20/06 |
| 10,122,806 | B1* | 11/2018 | Florissi | H04L 67/22 |
| 10,141,050 | B1* | 11/2018 | Kannan | G11C 11/5628 |
| 10,164,973 | B1* | 12/2018 | Prasad | H04L 63/063 |
| 10,210,926 | B1* | 2/2019 | Amiri | G11C 11/5642 |
| 10,261,958 | B1* | 4/2019 | Kenthapadi | H04L 63/0428 |
| 10,263,981 | B1* | 4/2019 | Prasad | H04L 63/083 |
| 10,268,839 | B1* | 4/2019 | Kenthapadi | G06F 21/602 |
| 10,291,696 | B2* | 5/2019 | Ying | H04L 67/1061 |
| 10,296,258 | B1* | 5/2019 | Richardson | H04L 67/1095 |
| 10,310,760 | B1* | 6/2019 | Dreier | G06F 3/0631 |
| 10,348,810 | B1* | 7/2019 | Florissi | H04L 67/2833 |
| 10,356,052 | B1* | 7/2019 | Ashley | H04L 67/12 |
| 10,374,968 | B1* | 8/2019 | Duerk | H04L 47/70 |
| 10,396,991 | B2* | 8/2019 | Arasu | G06F 21/78 |
| 10,404,787 | B1* | 9/2019 | Florissi | G06F 9/5083 |
| 10,423,938 | B1* | 9/2019 | Gaeta | G06Q 20/042 |
| 10,425,350 | B1* | 9/2019 | Florissi | H04L 47/352 |
| 10,430,350 | B1* | 10/2019 | Nimry | G06F 12/1408 |
| 10,452,444 | B1* | 10/2019 | Jibaja | G06F 3/06 |
| 10,454,677 | B1* | 10/2019 | Nagelberg | G06K 9/00087 |
| 10,460,126 | B2* | 10/2019 | Pead | H04L 67/20 |
| 10,484,174 | B1* | 11/2019 | Bernat | H04L 67/1097 |
| 10,484,387 | B1* | 11/2019 | Kenthapadi | H04L 63/108 |
| 10,496,330 | B1* | 12/2019 | Bernat | G06F 3/0659 |
| 10,499,525 | B1* | 12/2019 | Singh | H05K 7/1492 |
| 10,511,659 | B1* | 12/2019 | Florissi | H04L 67/18 |
| 10,514,978 | B1* | 12/2019 | Lee | G06F 11/0793 |
| 10,515,317 | B1* | 12/2019 | Kenthapadi | G06F 21/602 |
| 10,515,701 | B1* | 12/2019 | Aster | G06F 3/064 |
| 10,521,151 | B1* | 12/2019 | Fay | G06F 3/067 |
| 10,521,780 | B1* | 12/2019 | Hopkins, III | G06Q 20/10 |
| 10,528,488 | B1* | 1/2020 | Lee | G06F 3/0631 |
| 10,541,938 | B1* | 1/2020 | Timmerman | H04L 67/10 |
| 10,545,687 | B1* | 1/2020 | Bernat | G06F 3/0631 |
| 10,585,733 | B1* | 3/2020 | Colgrove | G06F 16/182 |
| 10,586,062 | B1* | 3/2020 | Rangan | G06F 21/6209 |
| 10,601,819 | B1* | 3/2020 | Prasad | H04L 63/0861 |
| 10,608,784 | B2* | 3/2020 | Yanovsky | G06F 21/6218 |
| 10,609,059 | B2* | 3/2020 | Apostolopoulos | H04L 63/1425 |
| 10,611,474 | B2* | 4/2020 | Kumar | H04W 4/029 |
| 2009/0113420 | A1* | 4/2009 | Pawlowski | G06F 9/5083 718/1 |
| 2010/0268692 | A1* | 10/2010 | Resch | G06F 11/1044 707/687 |
| 2010/0268877 | A1* | 10/2010 | Resch | G06F 21/10 711/114 |
| 2010/0268938 | A1* | 10/2010 | Resch | H04L 9/0897 713/153 |
| 2011/0102546 | A1* | 5/2011 | Dhuse | G06F 11/1004 348/46 |
| 2011/0205399 | A1* | 8/2011 | Gao | G11B 27/034 348/231.99 |
| 2013/0080559 | A1* | 3/2013 | Rao | H04L 43/10 709/208 |
| 2013/0104251 | A1* | 4/2013 | Moore | G06F 21/602 726/30 |
| 2014/0100884 | A1* | 4/2014 | Hamilton | G06Q 30/0201 705/3 |
| 2014/0281550 | A1* | 9/2014 | Resch | H04L 9/0822 713/171 |
| 2015/0100336 | A1* | 4/2015 | Ford | G06Q 10/06393 705/2 |
| 2015/0163206 | A1* | 6/2015 | McCarthy | G06F 21/6227 713/171 |
| 2015/0254003 | A1* | 9/2015 | Lee | G11C 14/0045 711/103 |
| 2015/0310188 | A1* | 10/2015 | Ford | G06F 21/10 726/28 |
| 2015/0339486 | A1* | 11/2015 | Shetye | G06F 21/6218 726/28 |
| 2016/0044092 | A1* | 2/2016 | Weber | H04L 29/08072 709/201 |
| 2016/0063560 | A1* | 3/2016 | Hameed | G06Q 30/0264 705/14.61 |
| 2016/0078245 | A1* | 3/2016 | Amarendran | H04L 67/10 713/193 |
| 2016/0092476 | A1* | 3/2016 | Stojanovic | G06F 16/211 707/805 |
| 2016/0125168 | A1* | 5/2016 | Aagesen | G06F 19/3481 705/3 |
| 2016/0253521 | A1* | 9/2016 | Esmailzadeh | H04L 63/308 726/4 |
| 2016/0294761 | A1* | 10/2016 | Hameed | H04L 67/306 |
| 2016/0301739 | A1* | 10/2016 | Thompson | H04L 67/2804 |
| 2016/0314327 | A1* | 10/2016 | Butler | H04L 67/1097 |
| 2017/0041296 | A1* | 2/2017 | Ford | H04L 63/0421 |
| 2017/0091659 | A1* | 3/2017 | Sanchez | G06N 5/04 |
| 2017/0091660 | A1* | 3/2017 | Sanchez | G06N 5/04 |
| 2017/0093700 | A1* | 3/2017 | Gilley | H04L 45/44 |
| 2017/0177222 | A1* | 6/2017 | Singh | G06F 3/061 |
| 2017/0272209 | A1* | 9/2017 | Yanovsky | H04L 67/1097 |
| 2017/0286319 | A1* | 10/2017 | Abbas | G06F 12/1408 |
| 2017/0364637 | A1* | 12/2017 | Kshepakaran | G06F 16/2465 |
| 2017/0364702 | A1* | 12/2017 | Goldfarb | G06F 21/6218 |
| 2017/0366395 | A1* | 12/2017 | Goldfarb | H04L 12/4633 |
| 2017/0373940 | A1* | 12/2017 | Shahab | H04L 41/12 |
| 2017/0374392 | A1* | 12/2017 | Hart | G06F 16/9024 |
| 2018/0005186 | A1* | 1/2018 | Hunn | G06F 40/103 |
| 2018/0018469 | A1* | 1/2018 | Moss | G06F 21/602 |
| 2018/0054490 | A1* | 2/2018 | Wadhwa | G06K 9/00771 |
| 2018/0060915 | A1* | 3/2018 | Liu | G06Q 30/0269 |
| 2018/0074724 | A1* | 3/2018 | Tremblay | G06F 3/0611 |
| 2018/0076954 | A1* | 3/2018 | Mesiano | G06Q 30/00 |
| 2018/0089278 | A1* | 3/2018 | Bhattacharjee | G06F 16/951 |
| 2018/0095685 | A1* | 4/2018 | D'Sa | G06F 3/0689 |
| 2018/0101684 | A1* | 4/2018 | Murphy | H04L 9/0637 |
| 2018/0121912 | A1* | 5/2018 | Morales | H04W 12/001 |
| 2018/0129955 | A1* | 5/2018 | Saxena | G06F 21/6245 |
| 2018/0137512 | A1* | 5/2018 | Georgiadis | G06Q 20/065 |
| 2018/0139278 | A1* | 5/2018 | Bathen | H04L 67/1095 |
| 2018/0165758 | A1* | 6/2018 | Saxena | G06N 5/04 |
| 2018/0167217 | A1* | 6/2018 | Brady | H04L 67/10 |
| 2018/0176229 | A1* | 6/2018 | Bathen | H04L 9/3247 |
| 2018/0183600 | A1* | 6/2018 | Davis | G06F 16/951 |
| 2018/0183606 | A1* | 6/2018 | High | G06F 16/2365 |
| 2018/0205546 | A1* | 7/2018 | Haque | G06F 21/6245 |
| 2018/0219888 | A1* | 8/2018 | Apostolopoulos | G06F 16/9024 |
| 2018/0232413 | A1* | 8/2018 | Eshwar | H04L 9/3239 |
| 2018/0232526 | A1* | 8/2018 | Reid | H04L 9/3239 |
| 2018/0253464 | A1* | 9/2018 | Kohli | H04L 9/3236 |
| 2018/0260125 | A1* | 9/2018 | Botes | G06F 16/275 |
| 2018/0262583 | A1* | 9/2018 | Primus | H04L 67/18 |
| 2018/0285996 | A1* | 10/2018 | Ma | G06Q 50/184 |
| 2018/0288154 | A1* | 10/2018 | Ghazaleh | G06F 3/0661 |
| 2018/0307859 | A1* | 10/2018 | LaFever | H04L 63/0407 |
| 2018/0336552 | A1* | 11/2018 | Bohli | H04L 9/3236 |
| 2018/0338001 | A1* | 11/2018 | Pereira Cabral | H04L 67/12 |
| 2018/0341930 | A1* | 11/2018 | Moir | G06F 16/27 |
| 2018/0349508 | A1* | 12/2018 | Bequet | H04L 67/10 |

(56) References Cited

U.S. PATENT DOCUMENTS

| | | | |
|---|---|---|---|
| 2018/0356989 A1* | 12/2018 | Meister | G06F 11/2089 |
| 2018/0357019 A1* | 12/2018 | Karr | G06F 3/0685 |
| 2018/0359089 A1* | 12/2018 | Innes | G06F 16/25 |
| 2018/0365309 A1* | 12/2018 | Oliner | G06F 9/542 |
| 2019/0004888 A1* | 1/2019 | Chagam Reddy | G06F 11/0709 |
| 2019/0005262 A1* | 1/2019 | Surla | G06F 3/0644 |
| 2019/0007206 A1* | 1/2019 | Surla | H04L 9/0822 |
| 2019/0013934 A1* | 1/2019 | Mercuri | G06F 16/212 |
| 2019/0018887 A1* | 1/2019 | Madisetti | H04L 9/3247 |
| 2019/0036887 A1* | 1/2019 | Miller | G06F 21/62 |
| 2019/0042407 A1* | 2/2019 | Gao | G06F 11/1088 |
| 2019/0065093 A1* | 2/2019 | Karr | G06F 11/3433 |
| 2019/0065788 A1* | 2/2019 | Vijayasankar | G06F 21/78 |
| 2019/0073152 A1* | 3/2019 | Nagle | G06F 3/0641 |
| 2019/0073666 A1* | 3/2019 | Ortiz | G06F 21/62 |
| 2019/0079998 A1* | 3/2019 | Rush | H04L 9/0643 |
| 2019/0087432 A1* | 3/2019 | Sion | G06F 21/62 |
| 2019/0114302 A1* | 4/2019 | Bequet | G06F 3/0488 |
| 2019/0114334 A1* | 4/2019 | Gunther | H04L 9/0643 |
| 2019/0121673 A1* | 4/2019 | Gold | G06T 1/20 |
| 2019/0121889 A1* | 4/2019 | Gold | G06F 16/2255 |
| 2019/0129818 A1* | 5/2019 | Kannan | G06F 11/0772 |
| 2019/0138555 A1* | 5/2019 | Bequet | G06F 16/9014 |
| 2019/0138638 A1* | 5/2019 | Pal | G06F 16/285 |
| 2019/0146998 A1* | 5/2019 | Jin | G06F 16/90344 718/104 |
| 2019/0147092 A1* | 5/2019 | Pal | H04L 67/10 707/713 |
| 2019/0171187 A1* | 6/2019 | Celia | G05B 19/4155 |
| 2019/0171365 A1* | 6/2019 | Power | G06F 3/065 |
| 2019/0172542 A1* | 6/2019 | Miladinovic | G11C 16/26 |
| 2019/0179564 A1* | 6/2019 | Bernat | G06F 3/0652 |
| 2019/0188046 A1* | 6/2019 | Florissi | H04L 9/3239 |
| 2019/0196731 A1* | 6/2019 | Sapuntzakis | G06F 3/0689 |
| 2019/0201136 A1* | 7/2019 | Shelton, IV | A61B 90/98 |
| 2019/0206562 A1* | 7/2019 | Shelton, IV | A61B 34/71 |
| 2019/0238412 A1* | 8/2019 | Vohra | H04L 41/0803 |
| 2019/0251279 A1* | 8/2019 | Emberson | H04L 63/0227 |
| 2019/0253431 A1* | 8/2019 | Atanda | G06F 21/62 |
| 2019/0279135 A1* | 9/2019 | Wilkerson | G06Q 10/06395 |
| 2019/0286373 A1* | 9/2019 | Karumbunathan | G06F 3/0661 |
| 2019/0288850 A1* | 9/2019 | Beecham | G06F 21/64 |
| 2019/0318243 A1* | 10/2019 | Margaglia | G06N 3/08 |
| 2019/0332921 A1* | 10/2019 | Rodriguez | G06F 16/29 |
| 2019/0340136 A1* | 11/2019 | Irwin | G06F 3/0683 |
| 2019/0354403 A1* | 11/2019 | Ayyagari | G06F 9/505 |
| 2019/0354708 A1* | 11/2019 | Fisher | G06F 21/6218 |
| 2019/0356609 A1* | 11/2019 | Grunwald | G06F 11/2082 |
| 2019/0356736 A1* | 11/2019 | Narayanaswamy | H04L 67/16 |
| 2019/0361626 A1* | 11/2019 | East | G06F 3/0664 |
| 2019/0361697 A1* | 11/2019 | Hu | G06F 8/433 |
| 2019/0370012 A1* | 12/2019 | Sears | G06F 3/0607 |
| 2019/0370288 A1* | 12/2019 | Bequet | G06Q 10/06 |
| 2019/0384790 A1* | 12/2019 | Bequet | H04L 67/10 |
| 2019/0386969 A1* | 12/2019 | Verzun | H04L 63/0464 |
| 2020/0019288 A1* | 1/2020 | Damore | H04L 67/104 |
| 2020/0026732 A1* | 1/2020 | Bequet | G06N 3/00 |
| 2020/0045111 A1* | 2/2020 | Kannan | H04L 12/40169 |
| 2020/0051189 A1* | 2/2020 | Williams | H04L 67/12 |
| 2020/0065686 A1* | 2/2020 | Vega | G06N 20/00 |
| 2020/0097270 A1* | 3/2020 | Bequet | G06F 16/9014 |
| 2020/0104294 A1* | 4/2020 | Alas | G06F 16/2365 |
| 2020/0106621 A1* | 4/2020 | Eshwar | H04L 9/3239 |
| 2020/0119926 A1* | 4/2020 | Buki | H04L 9/0637 |
| 2020/0162264 A1* | 5/2020 | Zamani | H04L 9/3297 |
| 2020/0410461 A1* | 12/2020 | Moir | H04L 9/3239 |
| 2021/0019444 A1* | 1/2021 | Miller | H04L 63/0407 |

OTHER PUBLICATIONS

U.S. Appl. No. 62/518,071, filed Jun. 12, 2017 (Year: 2017).*
U.S. Appl. No. 62/502,060, filed May 5, 2017, (Year: 2017).*
U.S. Appl. No. 62/374,307, filed Aug. 12, 2016 (Year: 2016).*
U.S. Appl. No. 62/470,172 (Drawings), filed Mar. 10, 2017 (Year: 2017).*
U.S. Appl. No. 62/518,071 (Drawings), filed Jun. 12, 2017 (Year: 2017).*
U.S. Appl. No. 62/502,060 (Drawings), filed May 5, 2017, (Year: 2017).*
U.S. Appl. No. 62/374,307 (Drawings), filed Aug. 12, 2016 (Year: 2016).*
Storj: A Peer-to-Peer Cloud Storage Network by Shawn Wilkinson et al., Dec. 15, 2016 V2.0; https://storj.io/storjv2.pdf; hereinafter Wilkinson (Year: 2016).*

* cited by examiner

SECURE ADAPTIVE DATA STORAGE PLATFORM

RELATED APPLICATIONS

This application claims priority to U.S. Patent Application Ser. No. 62/530,812, titled "Secure Adaptive Data Storage Platform", filed Jul. 10, 2017, and incorporated herein by reference.

BACKGROUND

Cloud computing offers convenient storage and access to data, often referred to as Infrastructure as a Service (IaaS) or Platform as a Service (PaaS). However, while such services offer a cost effective and convenient solution to data storage, security and data privacy are of concern, and prevent certain sectors of the business market from using these cloud storage solutions. These concerns are magnified by increasing news of hackers gaining access to healthcare records and selling them on a black market.

SUMMARY

In a first aspect, an adaptive data storage platform includes a plurality of nodes communicatively coupled together, a plurality of data stores, each data store associated with a different one of the nodes, and an immutable journal distributed between the plurality of nodes. Each node includes a processor and a memory storing machine readable instructions executable by the processor to implement a consensus trust module capable of: generating a majority voted and one-way hashed value for a request from an actor to access the database, wherein the hashed value is indicative of trust of the data; storing the hashed value in the immutable journal; and determining a consensus trust of the actor and data based upon the hashed value stored in the immutable journal by a majority of the plurality of nodes.

In certain embodiments of the first aspect, each node further includes machine readable instructions stored in the memory and executable by the processor to implement a data cloaking module capable of: ciphering received data; sharding the ciphered data into equally sized shards and storing each of the shards on at least one of the data stores; and sending each of the shards to another of the plurality of nodes for storing on a corresponding one of the data stores, wherein the node storing the shard creates an entry in the immutable journal to indicate the location of the shard. The data is thereby ciphered and distributed across the plurality of data stores.

In certain embodiments of the first aspect, each node further includes machine readable instructions stored in the memory and executable by the processor to implement the data cloaking module further capable of periodically sending at least one shard stored on the local data store to a different one of the nodes for storing on the corresponding data store, wherein the different one of the nodes creates an entry in the immutable journal indication the location of the shard. The data is thereby ciphered and distributed across the plurality of data stores and is not stationary.

In certain embodiments of the first aspect, each node further includes machine readable instructions stored in the memory and executable by the processor to implement the data cloaking module further capable of: retrieving at least one shard from the local data store, and at least one shard from another of the plurality of data stores, to form the ciphered data, and deciphering the ciphered data to allow access to the received data.

In a second aspect, a method protects a platform for storing data. The platform has a distributed immutable journal, a plurality of nodes, and a plurality of data stores, each data store corresponding to a different one of the nodes. Trust of a request, received from an actor, to store data in the platform, is determined based upon a consensus of trust for the request determined by the plurality of nodes and stored in the immutable journal. The request is rejected when the consensus of trust is not a majority. A cipher stream is generated based upon a key of the actor, and the data is cyphered as it is received using the cipher stream to form ciphered data.

Certain embodiments of the second aspect further include sharding the ciphered data into equally sized shards and sending each of the shards to one of the nodes for storing on a corresponding one of the data stores. The node storing the shard creates an entry in the immutable journal to indicate the location of the shard. The data is thereby ciphered and distributed across the plurality of data stores.

Certain embodiments of the second aspect further include periodically sending the shard to a different one of the nodes for storing on the corresponding data store. The different one of the nodes creates an entry in the immutable journal indication the location of the shard. The data is thereby ciphered and distributed across the plurality of data stores and is not stationary.

Certain embodiments of the second aspect further include retrieving at least one shard from the local data store, and at least one shard from another of the plurality of data stores, to form the ciphered data, and deciphering the ciphered data to allow access to the received data.

In a third aspect, a software product has instructions, stored on non-transitory computer-readable media. The instructions, when executed by a computer, perform steps for protecting a platform for storing data. The platform has a distributed immutable journal, a plurality of nodes, and a plurality of data stores. Each of the data stores corresponds to a different one of the nodes. The software product includes: instructions for determining trust of a request, received from an actor, to store data in the platform, based upon a consensus of trust for the request determined by the plurality of nodes and stored in the immutable journal, wherein the request is rejected if the consensus of trust is not a majority; instructions for generating a cipher stream based upon a key of the actor; and instructions for ciphering the data as it is received using the cipher stream to form ciphered data.

Certain embodiments of the third aspect further include: instructions for sharding the ciphered data into equally sized shards; and instructions for sending each of the shards to one of the nodes for storing on a corresponding one of the data stores, wherein the node storing the shard creates an entry in the immutable journal to indicate the location of the shard. The data is thereby ciphered and distributed across the plurality of data stores.

Certain embodiments of the third aspect further include instructions for periodically sending the shard to a different one of the nodes for storing on the corresponding data store. The different one of the nodes creates an entry in the immutable journal indication the location of the shard. The data is thereby ciphered and distributed across the plurality of data stores and is not stationary.

Certain embodiments of the third aspect further include: instructions for retrieving at least one shard from the local

DETAILED DESCRIPTION OF THE EMBODIMENTS

Figure 1:
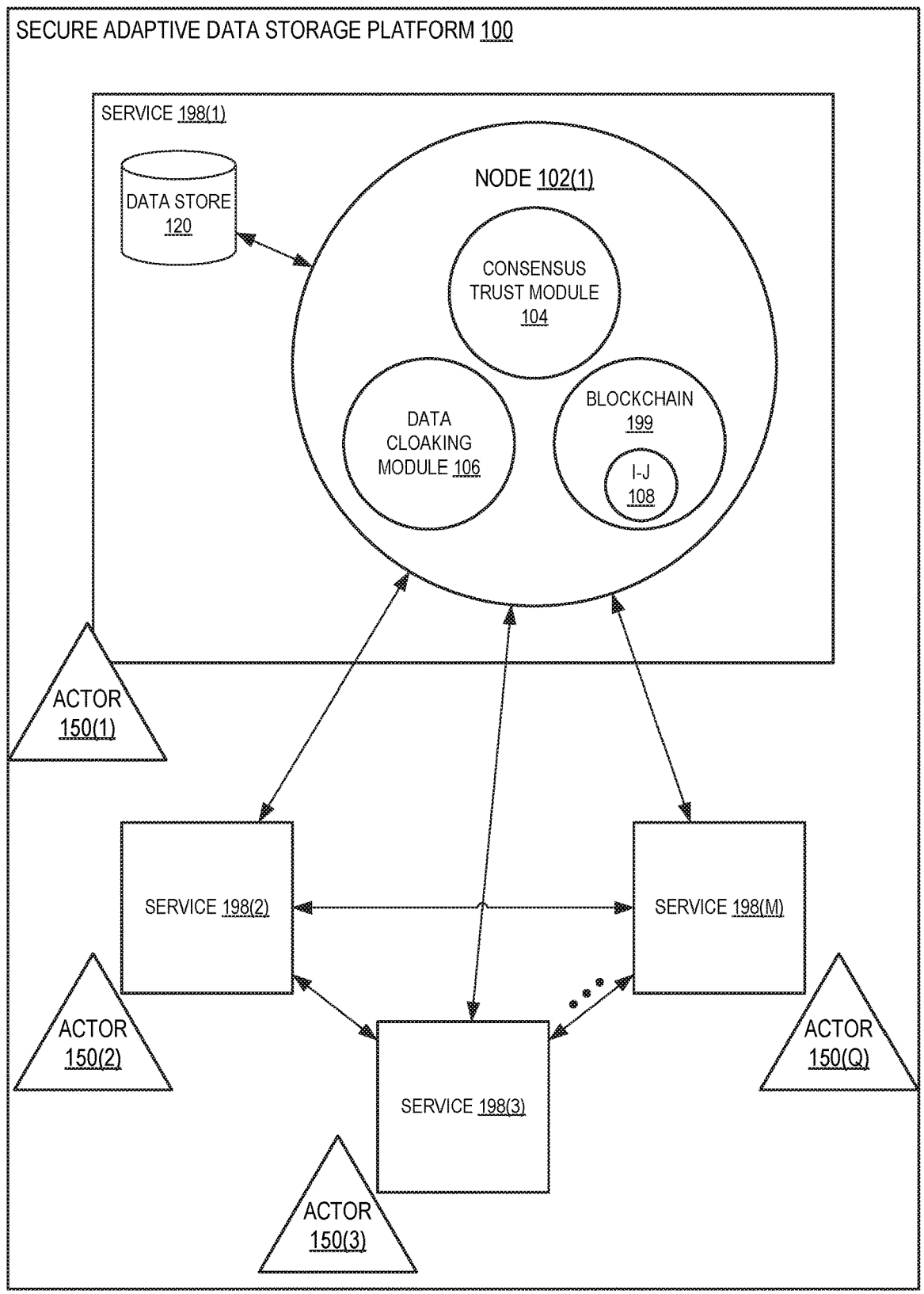
FIG. 1 shows one exemplary secure adaptive data storage platform, in an embodiment.

Over the last decade, we have witnessed an explosion of technology that has both enabled and accelerated movement towards Cloud computing. The convergence of the digital health innovations, the amazing strides in precision medicine, and the rapid acceleration of machine intelligence will usher in a new age in health. One in which everyone has access to the healthcare they need, one that improves the quality of life for everyone, one that many diseases will be eliminated, one we have yet to imagine, one that is truly person-centric.

The BiQ Token, backed by health data, will be the currency of this dramatic shift. A definitive healthID is created to allow people own and control their data.

Data Powers the Health Singularity

Data about you, what you do, how you feel, where you live, what you eat is the currency driving person-centric health. Corporations want to own it, researchers need more of it, and new companies are building things every day to collect more. The hackers on the dark web know it's valuable too; 1 in 4 security breaches are health related creating a multibillion dollar black market for health data and multibillion dollar economic remediation burden for health providers. Yet, individuals can't get to it, don't understand it, and can't control who uses it. Let's face it, at the end of the day, it's not just data, it's personal.

The Inventors hereof believe it's time to change this, and believe it's time to make health an everyday all the time thing. Thus, embodiments herein provide a secure and open platform for the person-centric revolution. A secure adaptive data storage platform for the Health Singularity.

The Person-Centric Health Economy

For the new health economy, person-centric is also about the changing role of individuals, one where they actively manage their health. Person-centric health will drive a significant shift in three areas: access, experience, and cost.

Access:

Based on the explosion and adoption of mobile technologies healthcare is quickly becoming accessible anywhere and anytime. Technologies traditionally found in hospitals and clinics are now available in a mobile form factor. Many have become consumer-operated (e.g., blood pressure devices, home defibrillators, heart rate monitors, wearable ultrasound devices), enabling a wide range of telehealth and remote monitoring scenarios. By 2020 there will be over 20 billion devices connected to the internet.

Experience:

Individuals are demanding a consumer experience that rivals the on-demand economy in other industries. In addition, they expect it to be personalized and meaningful. This also extends to providers. With the push to electronic medical records, providers are becoming more and more dissatisfied. Technology in this sense hasn't created a more intimate encounter. However, the next wave of technology will do just that.

Cost:

New care models are also driving new cost models. It isn't about the cost of care anymore, but rather it's about the value of outcomes. Data is the key to driving the underlying costs lower. Specifically, data that provides a personalized picture of the individual, data generated by the explosion of precision medicine tests such as pharmacogenetics, toxicology, cancer, and others.

Empower the Individual

Establish a HealthGraph™ for everyone on the planet. Make it free, simple to access, easy to use and secure. Provide individuals with the power to own, understand, use, and share their health data. Create a transformational platform that engages individuals in a smart and intelligent way that enables access to care providers 7×24.

Empower Care Providers

Make it easy to leverage the power of precision medicine, data, and access for personalized care plans. Simplify incorporating new digital health technologies and services that improve individual engagement and drive down the cost of care.

Empower Health Access

Make precision medicine accessible and affordable for everyone. Establish an open marketplace for applications, services, and benefits intelligently tailored to the individual based on their HealthGraph™ profiles.

Empower Innovations

Create a deep learning environment that expands the knowledge of an individual to improve research relevance and impact. Inspire new research models, strengthen data security, facilitate secure collaboration, and foster an environment of fast-paced learning.

Authoritative Data

Provide a secure adaptive data storage platform for individuals and organizations to create secure, authoritative, and verified data collections. Provide a data market place to donate, sell, and purchase data sources and research without compromising ownership rights.

Part I—Protect

FIG. 1 shows one exemplary secure adaptive data storage platform 100. Platform 100 is for example located in "the cloud" and is accessible via a computer network, such as the Internet. Platform 100 is formed of a plurality of nodes 102 that communication with each other via the computer network. Each node 102 is a computer that includes at least one processor, a memory comprising one or more of RAM, ROM, FLASH, magnetic media, optical media, and so on, and one or more interfaces for communication. Each node 102 operates to provide a service 198 to an actor 150, and thereby services 198 of platform 100 operate to store data received from one or more of the actors 150, and to make the stored data available to one or more of the actors 150. Platform 100 is uniquely situated to support the broader theory of swarm intelligence, by leveraging the combination of our distributed nodal architecture, advanced data security, and machine intelligence. Platform 100 provides dynamic intelligent data APIs that may drive many analytic approaches and artificial intelligence solutions. By combining various approaches, platform 100 provides a distributed learning environment where individual actors contribute specific intelligence and insights but collectively produce a very intelligent "swarm."

Each node 102 of platform 100 has software, formed of machine readable instructions stored in the memory and executable by the processor, including a consensus trust model 104 and a data cloaking module 106, and an immutable journal 108 that cooperate to provide protection of data stored within one or more data stores 120. Consensus trust module 104 provides the basis for managing trust across all components of platform 100. Trust (a central tenant of any security system) is managed on a peer-to-peer basis, where nodes 102 collectively manage trust. The nodes 102 of platform 100 are connected P2P using a leaderless gossip-based protocol. All communication for the P2P consensus algorithm occur over this protocol via a TCP/IP transport. Platform 100 does not have a central trust management node. Instead, nodes 102 work concurrently and in competition with one another to validate access to data stores 120. The immutable journal 108 provides "drill back" technology, with the ability to maintain an associative state between a completed analytic study to the original source data. The immutable journal 108 may be used to provide a proof of derivation for summary analytics.

Data cloaking modules 106 increase security of stored data by breaking received data into shards, where each shard is placed into a secure ciphered (e.g., encrypted) container, randomly distributed across data stores 120, and periodically moved between data stores 120. Nodes 102 thereby cooperate to enable a high protective state on sensitive data sets, while providing on-the-fly access to the data.

Immutable journal 108, implemented using BlockChain 199, is distributed across nodes 102 to provide a secure record of transactions that cannot be altered. Since immutable journal 108 is distributed across all nodes 102, each consensus trust model 104 in each node 102 is aware of, and may validate, all data transactions, thereby increasing security of access to data within data stores 120.

Consensus Trust

Figure 2:
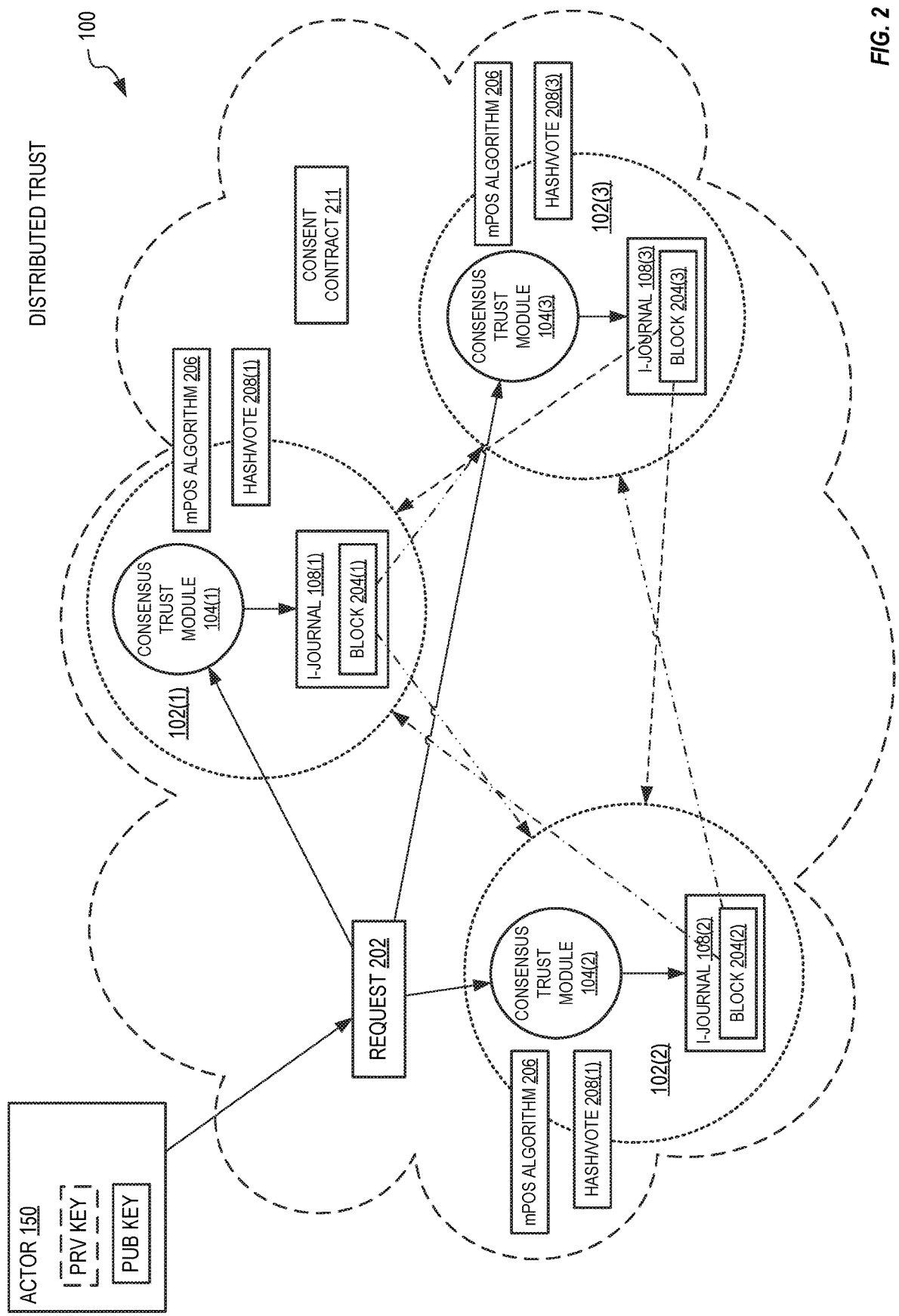
FIG. 2 shows exemplary determination of distributed trust by the consensus trust module of FIG. 1, in an embodiment.

FIG. 2 shows exemplary determination of distributed trust by consensus trust module 104 of FIG. 1. To store or access data within platform 100, actor 150 sends a request to at least one node 102. Request 202 is distributed to all nodes 102 of platform 100, and each node 102 uses a modified proof-of-stake (mPOS) algorithm 206 for each request 202. Within each node 102, the consensus trust module 104 uses the mPOS algorithm 206 to determine a hash/vote 208 that defines the integrity of the data and integrity of other voters' calculated hash values (e.g. SHA256). Since the voter (e.g., node 104) is trusted and has a stake in maintaining the integrity of the data for the collective good, it votes on the validity of the data and hash value. The data is updated with the new hash/vote 208 and other nodes 104 also collectively vote on the validity of the data until a majority is reached. The mPOS algorithm 206 and hash/votes 208 thereby function as a data integrity check for the data and ensure that a proper owner of the data is also identified. In one example of operation, actor 150 sends request 202 to node 102(2), which then distributes request 202 to nodes 102(1) and 102(3). Concurrently and independently within nodes 102 (1)-(3), consensus trust modules 104(1)-(3) use mPOS 206 to determine hash/vote 208(1)-(3) (e.g., a one-way hash and vote), respectively, based upon request 202. Consensus trust module 104 then creates and adds a block 204 corresponding to hash/vote 208 to immutable journal 108 after a majority is reached, which is automatically distributed to all other nodes 102 of platform 100. By working in this manner, no single node 102 is determining the trust of request 202, and therefore integrity of platform 100 has no single point of failure. As long as an attacker does not have more computing power than half the computing power of all nodes 102, security of platform 100 is preserved. Thus, no individual, surreptitious attacker is able to take-over ownership of trust within platform 100, and there is no single node/computer to hack. Trust is distributed throughout platform 100. Only when a predefined majority of consensus trust modules 104 agree to trust POW 208, is actor 150 given access to data within data stores 120. That is, only when a consensus of trust has been established for actor 150, is request 202 acted upon by data cloaking module 106.

Platform 100 implements a peer based authentication method to establish initial trust relationship. Platform 100 also monitors use patterns and excludes nodes 102 that act maliciously.

Data Cloaking

Figure 3:
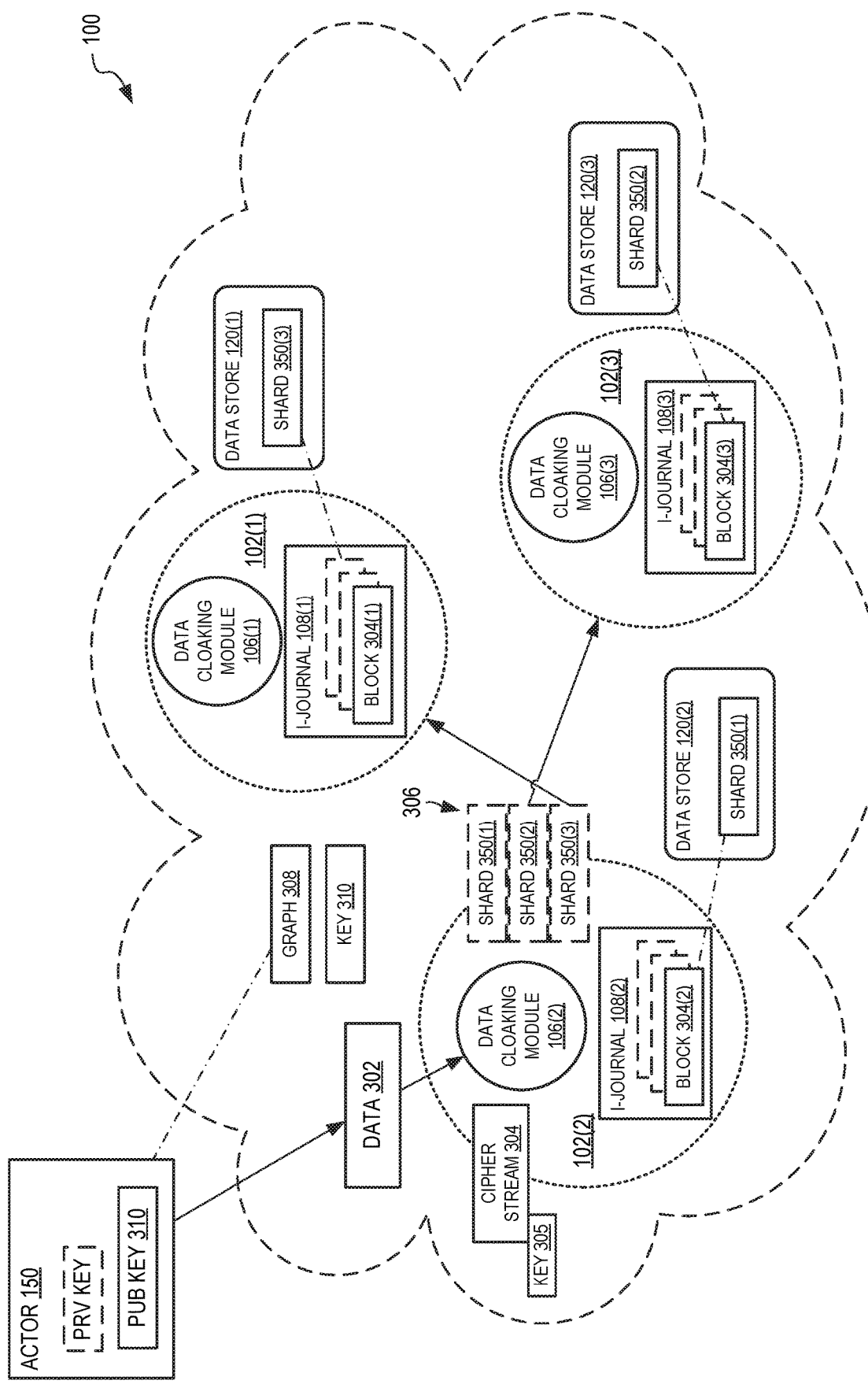
FIG. 3 shows exemplary data cloaking by the data cloaking module of FIG. 1, in an embodiment.
Figure 4:
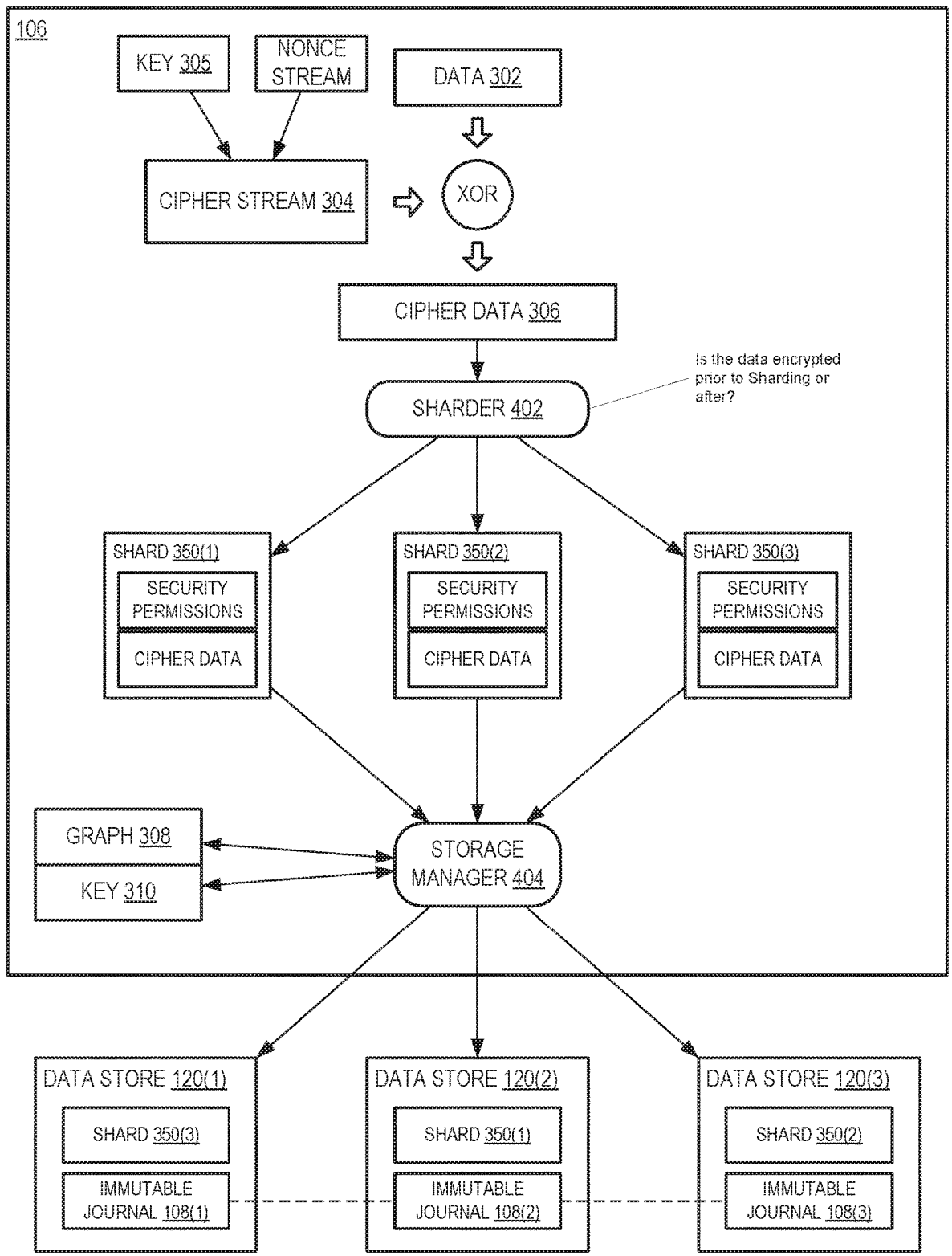
FIG. 4 is a dataflow schematic illustrating exemplary storage of data by the data cloaking module of FIG. 1, in an embodiment.

FIG. 3 shows exemplary data cloaking by data cloaking module 106 of FIG. 1. FIG. 4 is a dataflow schematic illustrating exemplary storage of data 302 by data cloaking module 106. FIGS. 3 and 4 are best viewed together with the following description.

Once a consensus of trust has been established for actor 150, actor 150 sends data 302 to node 102(2) of secure adaptive data storage platform 100. Data cloaking module 106(2) within node 102(2) creates a cipher stream 304 (a type of one-time pad) prior to receiving data 302. For example, cipher stream 304 is generated from a nonce stream and a cryptographic key 310. As data 302 is received, and prior to storing and/or transmission within platform 100, data cloaking module 106(2) ciphers data 302 using cipher stream 304 to generate cipher data 306. For example, data cloaking module 106(2) exclusive-ORs (XORs) the incoming data 302 with cipher stream 304 to form cipher data 306. Cipher stream 304 is used similarly to decipher cipher data 306. This approach allows platform 100 to handle very large data sets without the typical time/compute resource expenditures normally associated with cryptographic functions. This may be referred to as vertical data cloaking. Data cloaking module 106 may implement vertical cloaking using immutable journal 108 and one or more keys. For example, keys used for cloaking data 302 may be a composite of a hash of previous, current, and subsequent blocks of data in the original clear text stream. These keys may be stored within a data rights management layer of platform 100.

Data cloaking module 106 also implements "horizontal data cloaking" that subdivides the cipher data 306 into a plurality of subsets that are then shared across multiple nodes 102. As shown in FIG. 4, data cloaking module 106 includes a sharder 402 that divides cipher data 306 into a plurality of shards 350. In certain embodiments, shards 350 are of equal size, where a final shard 350 may be null filled (padded) when not filled by cipher data 306. Data cloaking module 106 uses multi-key management to protect each shard 350 against information loss and to maintain strict access control to each shard 350. Only permitted parties (e.g., actor 150) are allowed to access shards 350. Shards 350 that form one particular data set (e.g., cipher data 306, and thus data 302) may be referred to as an "information set".

The sharding approach is independent of where shards are stored. Shards 350 may be stored within a traditional RDBMS or NoSQL data store, a global content addressable key space as implemented in DHT, or directly in a block chain.

For each shard 350 created from data 302, a storage manager 404 of data cloaking module 106 determines at least one data store 120 for storing the shard, sends that shard to the corresponding node 102, keeping shards 350 that are to be stored locally. For each shard 350, data cloaking module 106 (either the local module 106 or a receiving module 106) adds a block 304 defining the shard and its storage location to immutable journal 108. Each block 304 may also identify the source (e.g., actor 150) and structure (e.g., type of data) of the portion of data 302 within the associated shard 350. As shown in FIG. 3:

data cloaking module 106(2) stores shard 350(1) in local data store 120(2) and creates block 304(2) within immutable journal 108(2), data cloaking module 106(1) receives shard 350(3) from node 102(2), stores shard 350(3) in data store 120(1), and creates block 304(1) within immutable journal 108(1), and data cloaking module 106(3) receives shard 350(2) from node 102(2), stores shard 350(2) in data store 120(3), and creates block 304(3) within immutable journal 108(3).

As described above, blocks 304 written to immutable journal 108 in one node are automatically distributed to all other nodes. Thus, immutable journal 108 contains immutable information as to the location of each shard 350. Thus, block 304 within immutable journal 108 defines the source and structure of data within its corresponding shard 350, together with the location of shard 350 within platform 100.

Periodically, within each node 102, storage manager 404 submits a block 304 containing a proof of maintenance (POM) to immutable journal 108 for each "local" shard 350 as evidence of maintenance of the shard at that node. These POM blocks 304 may be used to determine whether sufficient copies of each shard 350 are in existence within platform 100, and thus whether more copies of shard 350 should be created.

Non-Static Data

Periodically, within each node 102 of platform 100, storage manager 404 randomly selects and sends one or more locally stored shards 350 to one or more other nodes 102 for storage, and where immutable journal 108 indicates that sufficient copies of each moved shard are stored within platform 100, deletes the local copy of that shard.

Figure 5:
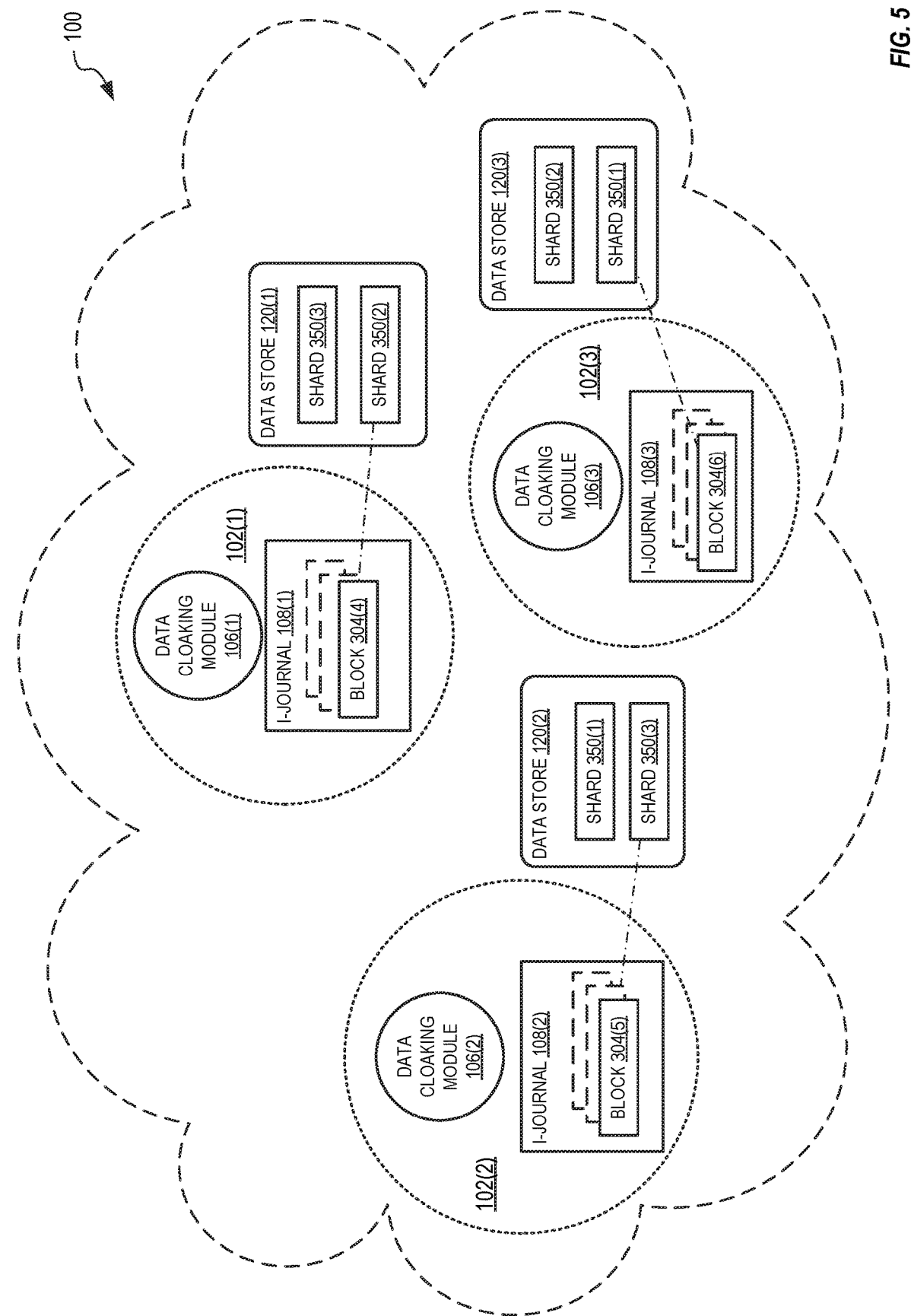
FIG. 5 shows a first exemplary maintenance step for distributing the shards within the platform of FIG. 1m in an embodiment.

FIG. 5 shows a first exemplary maintenance for distributing shards 350 within platform 100 of FIG. 1. In this example, Step 1:
data cloaking module 106(1) sends a copy of shard 350(3) to node 102(2), data cloaking module 106(2) sends a copy of shard 350(1) to node 102(3) and data cloaking module 106(3) sends a copy of shard 350(2) to node 102(1).

Step 2:
Data cloaking module 106(1) generates and stores a block 304(4) corresponding to shard 350(2) within immutable journal 108(1).

Step 3:
Data cloaking module 106(2) generates and stores a block 304(5) corresponding to shard 350(3) within immutable journal 108(2).

Step 4:
Data cloaking module 106(3) generates and stores a block 304(6) corresponding to shard 350(1) within immutable journal 108(3).

Thus, after this maintenance step, shards 350 are further protected through redundancy.

Figure 6:
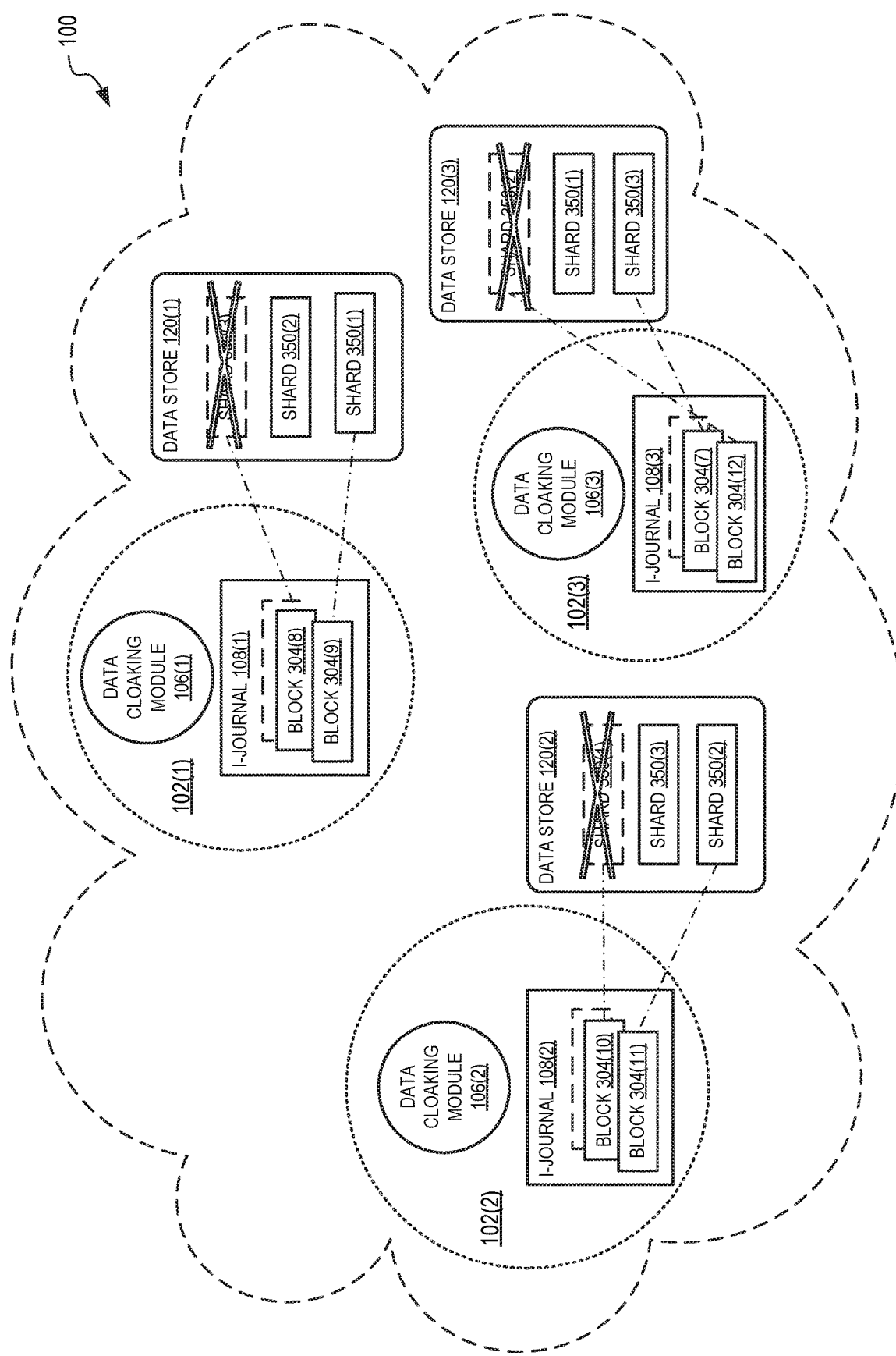
FIG. 6 shows a second exemplary maintenance step for moving the shards within the platform of FIG. 1, in an embodiment.

FIG. 6 shows a second exemplary maintenance step for moving shards 350 within platform 100. In this maintenance step:

Step 1:
data cloaking module 106(1) sends a copy of shard 350(3) to node 102(3), data cloaking module 106(3) generates and stores a block 304(7), corresponding to storing of shard 350(3) within data store 120(3), within immutable journal 108(3), and data cloaking module 106(1) deletes shard 350(3) from data store 120(1) and generates and stores a block 304(8), corresponding to deleted shard 350(3), within immutable journal 108(1).

Step 2:
Data cloaking module 106(2) sends a copy of shard 350(1) to node 102(1), data cloaking module 106(1) generates and stores a block 304(9), corresponding to storing shard of 350(1), within immutable journal 108(1), and data cloaking module 106(2) deletes shard 350(1) from data store 120(2) and generates and stores a block 304(10), corresponding to deleted shard 350(1), within immutable journal 108(2).

Step 3:
Data cloaking module 106(3) sends a copy of shard 350(2) to node 102(2), data cloaking module 106(2) generates and stores a block 304(11), corresponding to storing shard of 350(2) within data store 120(2), within immutable journal 108(2), and data cloaking module 106(3) deletes shard 350(2) from data store 120(3) and generates and stores a block 304(12), corresponding to deleted shard 350(2), within immutable journal 108(3).

Thus, shards 350 periodically move location within platform 100. Since shards 350 are not static, and are distributed across more than one data store 120, the "attack profile" for hackers of the stored data is significantly reduced, since the data is not in a single location and is constantly moving. This approach also provides a disaster recovery capability "baked in", since the shards are stored in multiple locations, as shown in FIG. 6, such that catastrophic failure of any one location does not result in data loss. Platform 100 may include fewer or more nodes and data stores without departing from the scope hereof. Shards may be stored in fewer or more than two locations without departing from the scope hereof.

Data Access

Figure 7:
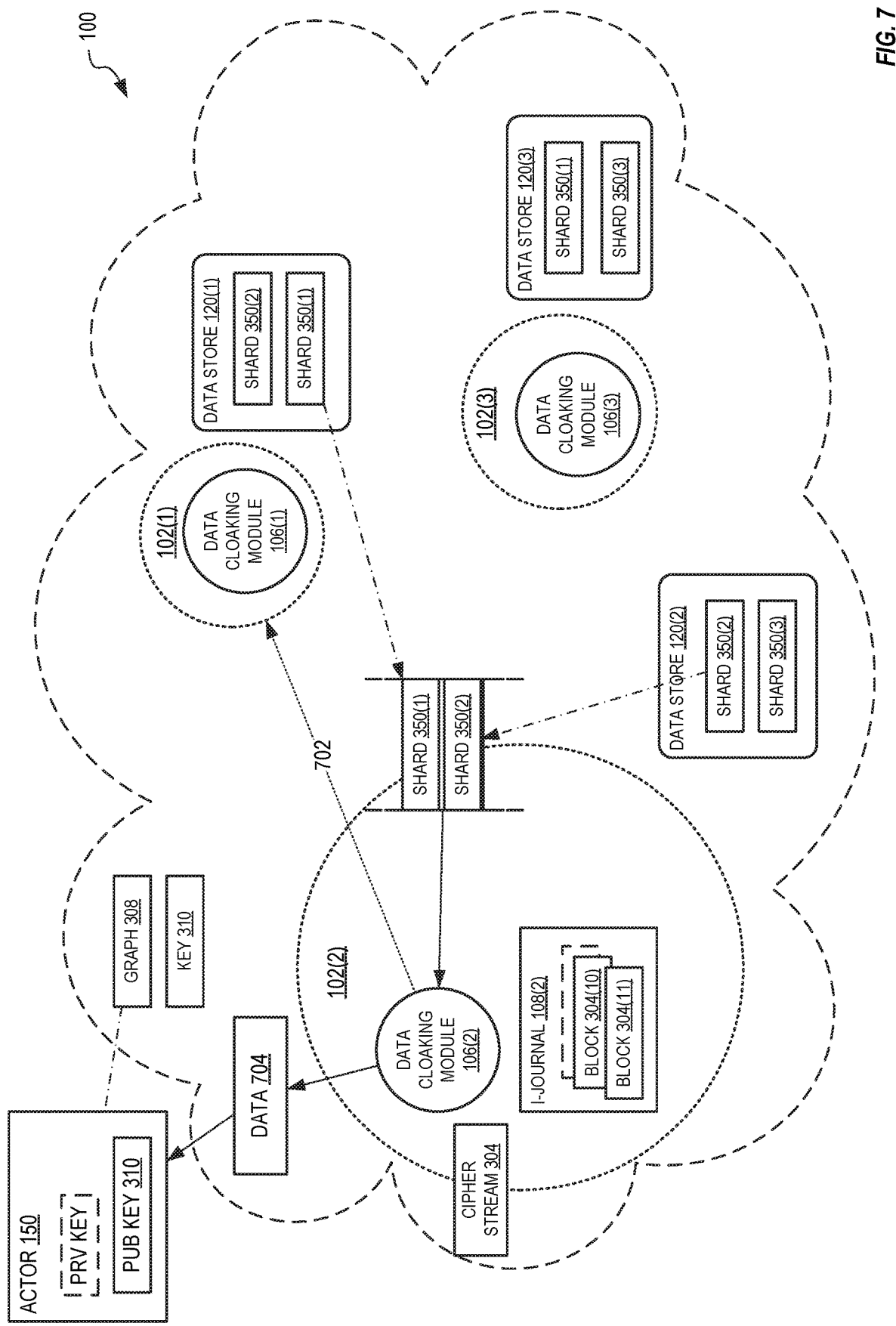
FIG. 7 shows exemplary data retrieval by the data cloaking module within the platform of FIG. 1, in an embodiment.

FIG. 7 shows exemplary data retrieval by data cloaking module 106 within platform 100 of FIG. 1. To access any part or all of the information set (i.e., data 302), data cloaking module 106 searches immutable journal 108 for blocks corresponding to shards 350 of data 302. Data cloaking module 106 then determines a proper topology of keys 310 (not actual keys themselves) used to protect shards 350, and compares that journal to a graph 308 that represents the identity of the information requestor. Data cloaking module 106 then determines a current location (i.e., one or more nodes 102 and/or data store 120) of each shard 350 needed for the requested data, and then sends a message 702 to each corresponding node 102 to requests those shards from the determined locations. Where the data is stored local to data cloaking module 106, it is retrieved directly from the data store 120. For example, based upon blocks 304, data cloaking module 106(1) sends message 702 to node 102(1) requesting shard 350(1) from data store 120(1), and retrieves shard 350(2) from data store 120(2). Once the necessary shards 350 are received, data cloaking module 106 uses the appropriate portion of cipher stream 304 to decipher shards 350 to form data 704.

One side effect of this approach is that original cloaking operations, as well as recovery of data, tend to be distributed across the network topology of platform 100, thereby avoiding the inadvertent creation of "hot spots" which could impact network performance.

Immutable journal 108 is based on a cryptographically sound set of industry-standard protocols, providing the ability to have a secure record of transactions that cannot be altered, and be inherently distributed across the network providing a means of data protection.

Intelligent models learn the why, how, when, and where behaviors will change to prompt optimal engagement.

HealthGraph

One underlying core concept of secure adaptive data storage platform 100 is built-in support for a HealthGraph. Using machine intelligence, the HealthGraph represent person-centric data constructs and data streams govern by secure informed (smart) consent contracts (see consent contract 211, FIG. 2).

HealthGraphs allow users to construct data collections across different data domains. They also provide the foundational attributes for our smart contracts to include: token settlements, secure data zones, and a management interface. All individuals will be able to own and manage their personal life graph free.

Platform 100 implements HealthGraphs using a machine learning capability that creates HealthGraph data structures of an individual's health data. The HealthGraph data structures identify authenticated data objects and define a relational map of these data objects. The HealthGraph data structure provides allows platform 100 to include an intelligent data API and semantic query structure to simplify the complexity of data access and to facilitate advanced augmented intelligence solutions.

Secure Data Grid

Managing, protecting, and understanding healthcare data requires a new approach that is not as simple as exposing an interface to existing legacy data. The new approach provides end-to-end data rights management, a secure data store, and an indisputable chain of custody with advanced security techniques for protecting the data. With platform 100, maintaining individual privacy is paramount.

Platform 100 provides underlying constructs for verifiable data objects and stores those data objects by leveraging technology of BlockChain 199 and data cloaking services. Within platform 100, data verification proofs are easy to share along with direct access to the data collection based on a layered security access model. The data cloaking service provides an additional layer of security that scatters and ciphers data packets across a nodal framework. Platform 100 provides transparent, seamless and interoperable data access. Platform 100 may provide data management tools to support achieving these objectives.

Within platform 100, a secure data grid provides specific data security, consent, flexibility, cross-domain extensibility, and connectivity of individuals and data. Functionally there are several key elements: Machine Intelligence (BigData Analytics and Deep Learning), Dynamic APIs, Data Cloaking, and finally the BlockChain).

Within the healthcare space (and many other verticals), concern over data security is high. BlockChain alone does nothing to protect the data itself. All data on the BlockChain is open and transparent. Data that form Protected Health Information (PHI) and/or Protected Identity Information (PII) has to be protected, and many prior art solutions decouple BlockChain management and storage of PHI and PII data. Platform 100 integrates BlockChain 199 and a secure data grid to solve this issue.

Verified Data Element

Verified data elements are built upon a self-aware data object model. This model couples ownership and use parameters that drive data relationships and ownership and use profiles.

Platform 100 provides a frictionless data input and access layer that supports several interfaces, including one or more of: FHIR, HL7, XML, EDI, X12, JSON, CSV, XLSX, and other protocols. Platform 100 also supports multiple transports, including one or more of HTTPS, SFTP, Queue, Stream, IoT, Web Socket, batch, and so on. Data may be received from multiple data sources (e.g., hospitals, labs, patients, radiology, devices, other).

Figure 8:
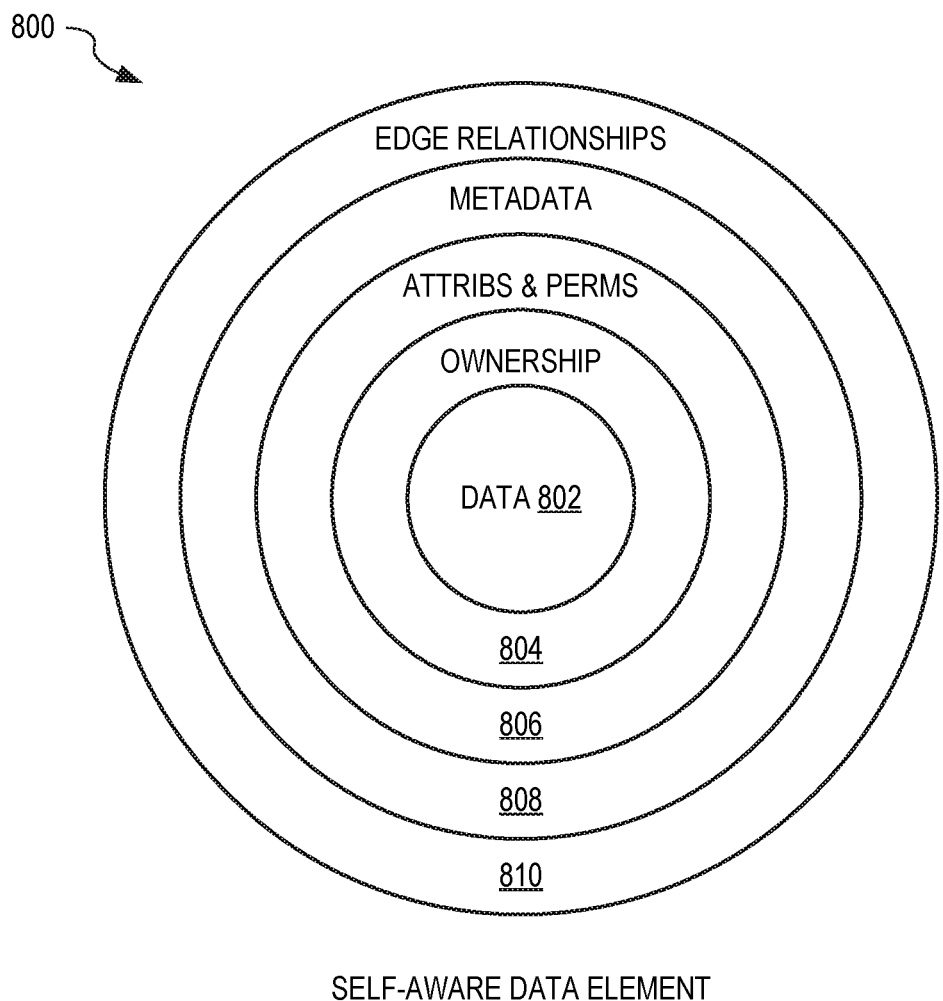
FIG. 8 is a schematic showing one example of a self-aware data element, in an embodiment.

FIG. 8 is a schematic showing one example of a self-aware data element 800. As data 802 (e.g., an asset) is consumed, it is immediately converted to a verifiable state by one node 102 of platform 100. Consensus trust model 104 validates the data and gains a voting consensus on the data from other nodes 102. Once approved, the data is promoted to be a verified data set. This allows the data to be immutable and provable within the context of a complete data set. Self-aware data element 800 includes data 802 (e.g., data 302, FIG. 3), ownership information 804, attributes and permissions 806, metadata 808, and edge relationships 810. Permissions 806 may be dynamically derived via Consent Contracts. Other than ownership, no other explicit permissions are attached to the data element.

Usage of the Self-Aware Data Element 800 layers vary by use-case. Obviously, the clear data element 802 is used by applications and the end user. Ownership 804 is enforced at the access layer, node 102 such that only owners can edit, delete, transfer ownership and write smart contracts to grant permissions to other users. Attributes 806 and metadata 808 may include data tags (key/value pairs) that the data owner may apply to help identify commonalities and descriptions (e.g., tagging several data elements with DATA_TYPE=LAB). Metadata is also query-able by users.

Immutable Journal (Aka BurstChain)

Immutable journal 108 is a "Big Data" focused, NoSQL storage backed BlockChain engine 199. Immutable journal 108 allows analytics to be performed on both the data (e.g., data 302, FIG. 3) and the block data. Platform 100 combines the block data (e.g., blocks 304) and the users' data (e.g., data 302) in the same query-able structure to promote functionality for consent and ownership within a single step. Thus, the implementation of platform 100 does not require database administrators to manage multiple data stores for the point of analytics.

Immutable journal 108 implements a distributed and permissioned BlockChain architecture that uses a consensus and voting algorithm to provide better throughput, as compared to conventional implementations of BlockChain, for data ingestion, thereby solving the low-throughout of prior-art proof-of-work algorithms.

Immutable journal 108 enforces ownership of data 302. Data used for analytics (or transaction) purposes is only available through explicit access of ownership or through explicit access via owner-created Consent Contract(s). Consent Contracts are a JSON document that defines Boolean logic for granting or revoking access to corresponding data 302. Consent Contracts give an individual rights over his/her health information and set rules and limits on who may look at and receive this information through an informed consent process.

Consent Contracts

Consent contracts provide the overall data rights management, enforcement, and security for individual data elements and data collections. Data use permissions, security, and value attributes are embedded in the data object itself. Platform 100 may expose a comprehensive API and management interface to allow data owners create and manage consent contracts.

Platform 100 may expose verifiable data sets through the consent layer to the Ecosystem layer. The Consent Layer enforces 2 types of consent: 1) implicit and 2) explicit. Implicit consent is inherent to the Self-Aware Data Element (aka Verifiable Transaction); the autonomous data element has owner(s) that provide the accessor the rights to the data. Additionally, an owner(s) may grant explicit consent to their data elements by way of the Consent Contract. The Consent Contract defines the rules (and possible time limitations) and what data may be accessed by whom. The Consent layer enforces both consent types upon all data access requests.

The Consent Contract derives the answer to this question "Should the requester get access to my data?" The "Granted To" entity is identified as part of the Consent Contract. During any data query the implicit rights (being owner of the data) and the explicit rights (via Consent Contract) granted are enforced.

Identity

Ownership and Consent mechanism require a strong Identity solution. Creating and managing a common Health Identity (healthID) becomes foundational for universal health access. Our platform provides the ability to identify and protect and individual's identity across multiple repositories. By doing this, we can also provide the individual access their information, provide consent for others to see and use their information, and receive notifications when their information is accessed. This data access layer can enable a whole new generation of personal and precision health applications highly tailored to the individual.

Ecosystems

The Ecosystems layer contains subscription based solutions and data domains. These solutions may range in complexity from a data processing that manages complex business logic for other applications, to a fully formed front-end UI that provides a full stack application using protocols of platform 100. For example, the BurstIQ Adaptive Intelligence Analytics (AIP) application and an Electronic Medical Record (EMR) Consent application. Platform 100 provides a visualization and intelligence aggregation capability for users. Adaptive intelligence capability consists of a library of pre-developed analytics insights along with a software development kit that allows third parties to develop and sell additional analytics and intelligence modules. As a starting point, the adaptive intelligence capability provides a lower cost of entry, as compared to current market place analytics solutions, which may save organizations several hundred thousand dollars per year in unnecessary licensing costs.

The Ecosystem creator may define the economic contracts for reselling their applications to other entities without dealing with the issues of platforms, databases, connectivity, etc. and just focus on the business solution they provide. The fee model and business models may vary from application to application as dictated by the Creator.

The Ecosystem may leverage the dynamic definition of data domains, so that consented Verified Transactions are used. These data elements may be used in a variety of Big Data and Deep Learning algorithms to support the business needs. The Ecosystem uses both NoSQL and Graph databases for the purposes of data exploration and exploitation.

Immutability of data 302 is also enforced; however, there are mechanisms for transferring and updating the data after creation; only by the owner. The update and transfer operations against a block (e.g., data 302) result in a new block 304 in the immutable journal 108. However, the self-aware data element contains identifiers for previous versions of the block. When a query is performed, ONLY the current version of a block is query-able. However, once a block is identified, the user may request to see all previous operations on that block (which is the audit trail).

The Immutability of data 302 is enforced at the chain and sub-chain levels. Data within a block is always immutable; EXCEPT in the case when the owner of data requests ERASURE. This is a mandatory requirement for enterprise data management. ERASURE of a block will remove the asset and asset metadata of the block and all the previous versions of the block (aka the block's sub-chain); all other block information remains. The hash (unique id) of the block in the chain is unaltered. Ensuring that the hash value is not altered so that the block's position in the chain is preserved. It also allows the full chain to be validated from ORIGIN to TAIL. However, the erased asset data of the block prevents the hash from being recalculated to match the original hash. This is acceptable to keep the chain and sub-chains provable.

Smart Contracts may be written with the intent of creating new data, transferring data, and updating data. Another distinction provided by platform 100 is the ability for the application to update data without violating immutability. Immutable journal 108 also allows for implicit access and rights to the self-aware data elements through ownership. Immutable journal 108 does not implement access and rights using a separate table or database (as done in the prior-art); rather, platform 100 provides access and rights through a self-aware data element (See FIG. 8). Through the Data Hiding capabilities of platform 100, the BlockChain is secured through multiple means, thereby keeping data 302 safe, immutable, provable, and auditable.

In one embodiment, platform 100 uses four types of Smart Contract:
1. Asset Creation: may produce another asset (e.g., data) as part of its execution. For example, the smart contract may add another asset (data) that documents fulfillment of an order (transaction).
2. Asset Transfer: may dictate that the asset identified by the smart contract is to be transferred to another entity.

3. Consent: may return a value to allow the requestor access or not to the asset.
4. General: may run the requested smart contract and perform steps defined in the contract.

Platform 100 may use several different modes for invoking the smart contract:
1. On-creation: steps of the smart contract are performed on any new block/data being created.
2. On-demand: the smart contract is invoked upon a user-request (against 1 or many blocks). Smart contacts may use NoSQL database tools such as Map-Reduce, pipeline, and TQL, for on-demand execution.
3. On-event: the smart contract is invoked by an event (e.g., a timer). For example, an escrow smart contract may be invoked when two or more parties have fulfilled their agreed upon actions to release the corresponding asset to the previously agreed upon entity.
4. On-access: the smart contract is invoked when access to the corresponding asset is requested and operates to grant the access to someone other than the owner(s). Reserved specifically for Consent Contracts.

By default, immutable journal 108 stores assets (e.g., data 302) as unstructured data (e.g., as defined by the creator of the asset). Platform 100 and immutable journal 108 also allow an application developer to define a non-structures, a semi-structured, or a fully structured asset. Immutable journal 108 performs validation on the asset at creation time to ensure that the asset adheres to the no, semi- or fully structured definition. Data types are also enforceable, and basic normalization of data types occurs. The structures may be complex and contain nested objects. Finally, the definition of the asset may contain indexes, which are created to aid in queries.

Since immutable journal 108 may use a NoSQL engine, the ability to horizontally scale storage and query performance is close to a NoSQL engine. The protocol used by immutable journal 108 does add necessary overhead for block creation and management while managing verifiable data sets. However, the tradeoff is the ability to scale out to tera- or peta-bytes of data. Scaling within prior-art Block-Chain has already experienced issues.

With the features of a NoSQL engine and unstructured data (or semi- to fully structured data) the ability for full normalization is not necessary. Schema-on-read is used to apply additional structure or relationship upon the query (or read) of the data. This eliminates the costly need of Extract-Transfer-Load (ETL) or structuring data for analytics (and the costly steps of restructuring data when the requirements of the analytics change). It is here that immutable journal 108 may seamlessly integrate the data of a chain(s) into a Graph for the purposes of expanding the analytic capability of the data.

Various protocols have been and are being developed which have distinctions that are advantageous to the use-case or problem set at hand and then there are some features that are detractors. Immutable journal 108 was created to address the needs of healthcare and data security while leveraging the benefits of BlockChain and Big Data analytics. Immutable journal 108 unlocks the data in ways that traditional BlockChain and databases cannot achieve.

Connect

Advantageously, platform 100 unites disparate structured and unstructured data sets from different vendors in one view. Platform 100 may thereby connect and safely use unlimited data sources, such as one or more of: EMR, revenue cycle, Facebook, demographics and more.

Figure 9:
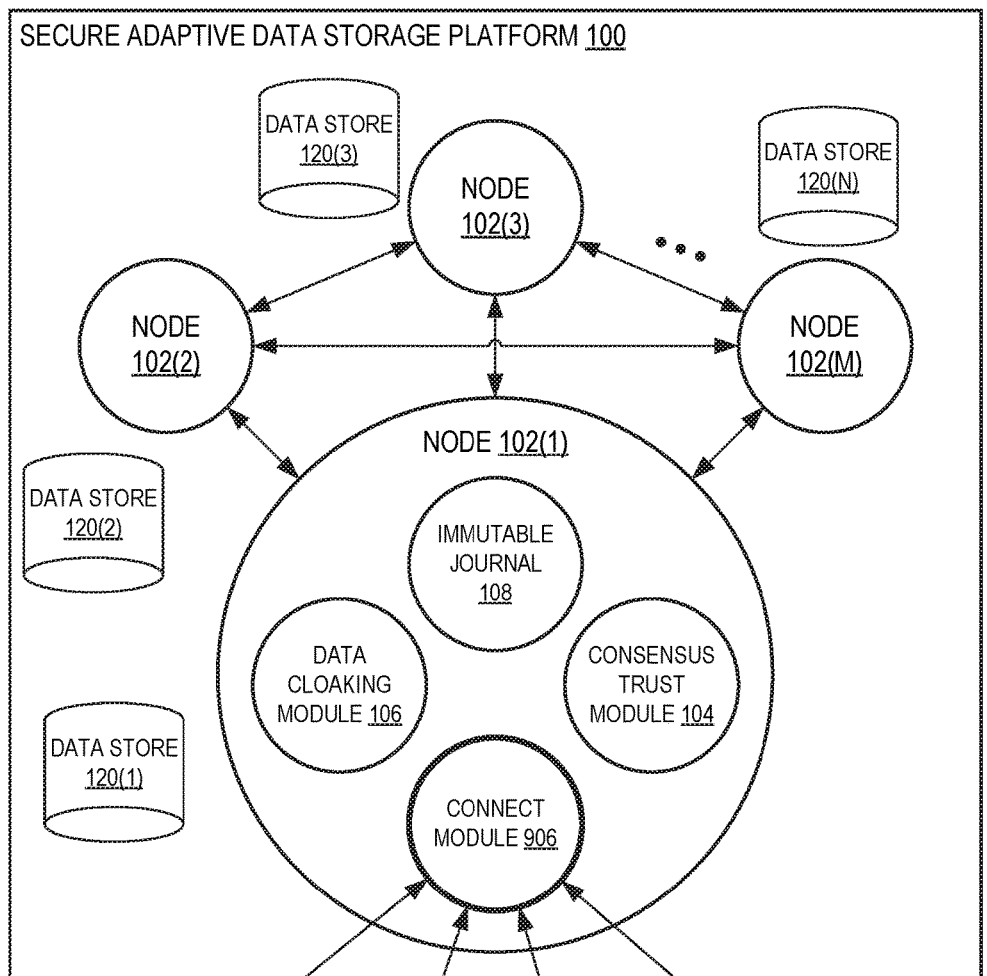
FIG. 9 shows the platform of FIG. 1 using a connect module within one node to collect disparate structured and unstructured data, in an embodiment.
Figure 9:
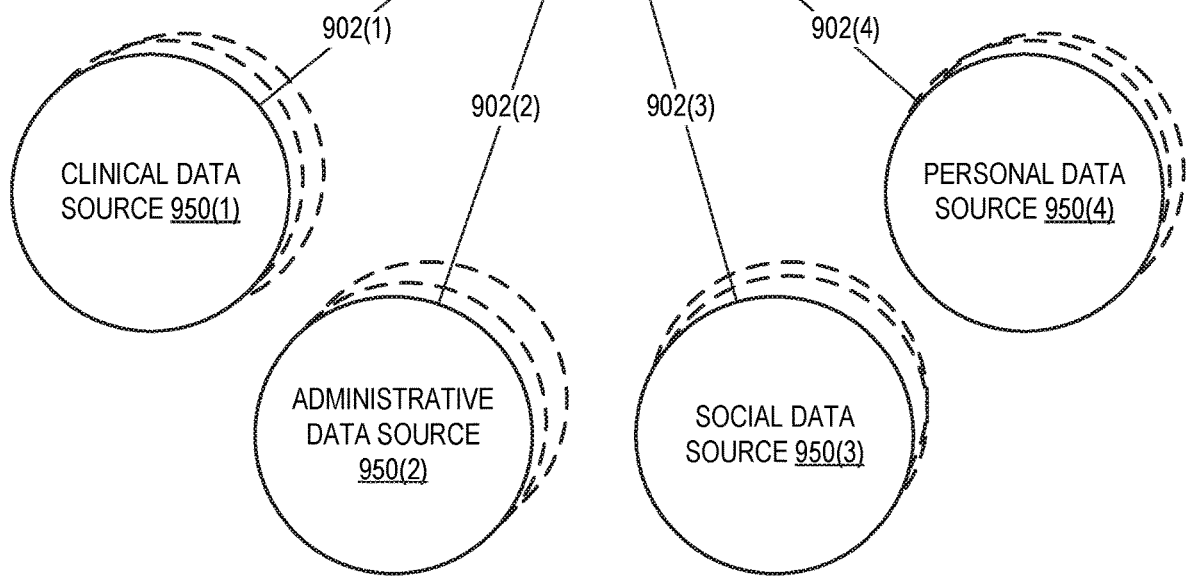

FIG. 9 shows platform 100 of FIG. 1 using a connect module 906 within node 102(1) to collect disparate structured and unstructured data 902. Connect module 906 may operate in any one or more of nodes 102 to collect data 902 for storage within platform 100. Connect module 906 may collect data in many different formats including FHIR, JSON, CSV, Excel, EDI, XML using a batch file interface, REST end points, sockets, or other transports. In the example of FIG. 9, data 902(1) is collected from clinical data sources 950(1), data 902(2) is collected from administrative data sources 950(2), data 902(3) is collected from social data sources 950(3), and data 902(4) is collected from personal data sources 950(4). Connect module 906 may accept queuing technologies for streaming data ingestion and enforces the unstructured, semi-, or fully structured data objects (as discussed above). Connect module 906 may also perform basic normalization for data typing. For example, connect module 906 may ensure that dates and numerics are properly typed and stored (especially when originating from streamed based protocols). For data elements to be queried properly, their data types should be standardized (structure may be done as part of schema-on-read).

Connect module 906 provides connectivity to other sources and consumers of information. This connectivity ranges from a simple integration with a legacy relational database, up to cloud-scale interactions supporting medical field research across a global network of measurement devices (e.g.: a global wearable device info-grid).

As shown, connect module 906 supports four key types of integration: Clinical, Administrative, Social, and Personal. Thereby, platform 100 supports deep integration and analytics with clinical systems, able to support the diversity and depth of data inherent in these systems. Platform 100 also supports connectivity and interoperability with key administrative systems that process and manage the "back office" of providers and payers, reducing uncollectables and improving profitability of providers. Platform 100 also supports information streams from popular social media (Twitter, Facebook, etc.), as well as personal connectivity into the growing swarm of wearable/embeddable health technology already available in the market place.

Insight

Figure 10:
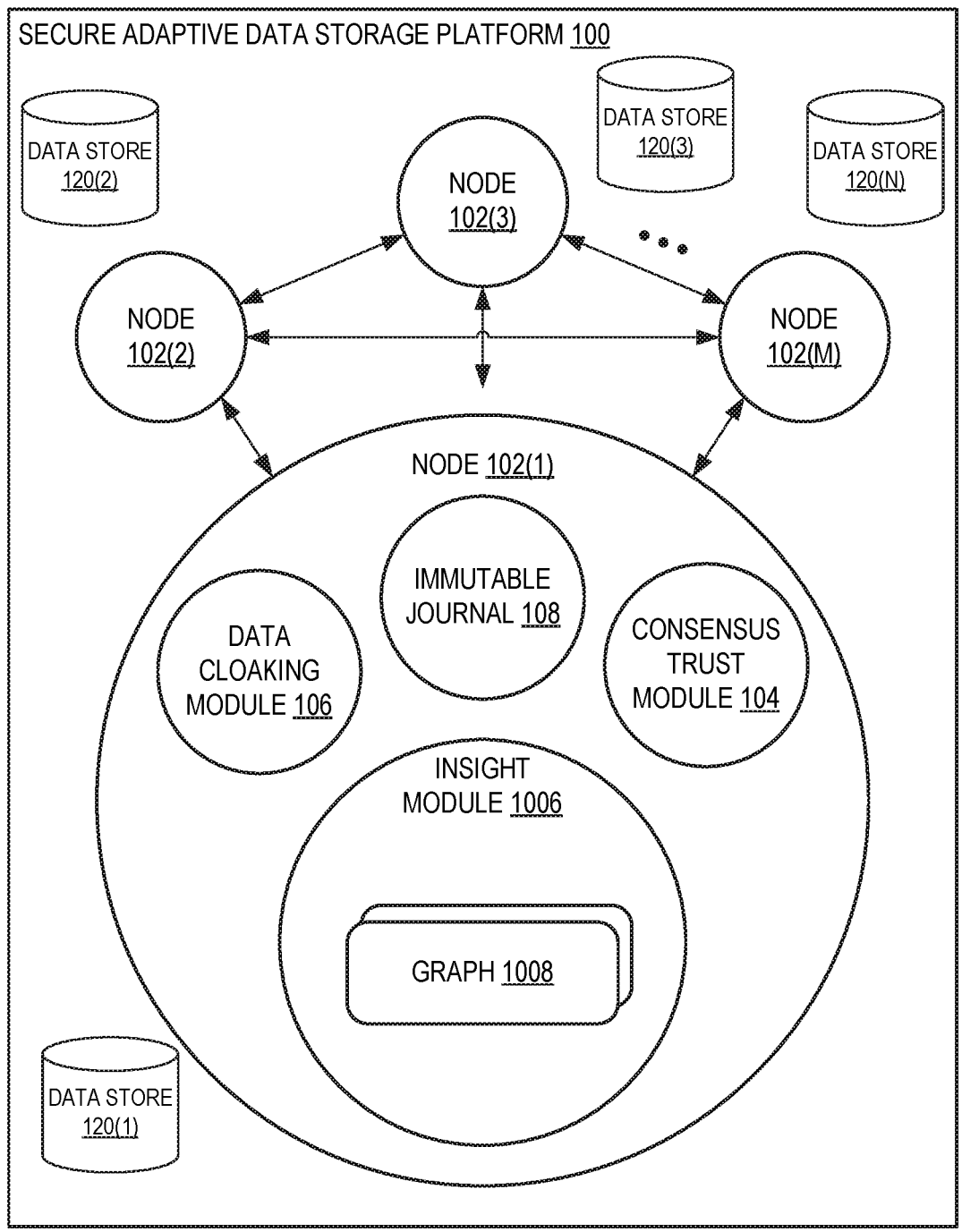
FIG. 10 shows the platform of FIG. 1 using an insight module within one node to generate one or more graphs of data stored within the platform, in an embodiment.

FIG. 10 shows platform 100 of FIG. 1 using an insight module 1006 within node 102(1) to generate one or more graphs 1008 of data stored within platform 100. Insight module 1006 may be implemented within two or more nodes 102 of platform 100 that collectively operate together to provide the functionality of insight module 1006 as described herein.

Insight module 1006 uses one or more of consensus trust module 104, data cloaking module 106, and immutable journal 108 to retrieve data from platform 100 and to generate graph 1008 containing that data. Insight module 1006 includes machine learning that operates at a cloud scale and with transactional speed. It is known that looking at a slice of data without context limits insight into that data, which is akin to seeing only the dots on a canvas. Insight module 1006 generates graph 1008 by adding data sources and using a variety of analytic techniques to provide a richer, more complete, and contextualized image of that data. Insight module 1006 uses machine learning, high-speed processing and real-time answers to paint clear pictures of the data for the user.

Insight module 1006 provides the basis of the analytics provided by platform 100. Insight module 1006 is designed to process streams of information, setting the stage for rapid adoption of Digital Health. A Distributed Commit Log (DCL) underlies the foundation for the Insight log. Insight module 1006 allows platform 100 to horizontally scale the data rapidly collected by connect module 906, FIG. 9, for example.

Insight module 1006 operates in each node 102 to provide a real time distributed computation "engine." Any number of transformational grammars may be constructed on the fly and applied in parallel to these data streams, to create derivative streams that provide continuous insight (analytic answers) to multiple simultaneous downstream applications and network services.

In one example of operation, consider the following problem: for a large population of individuals use some form of wearable device (e.g.: a fitness tracker) that collects heart and respiration information, collect and analyze the data to provide care for those individuals. The solution is easily realized by platform 100, where connect module 906 is used to receive a continuous high-velocity stream of information from the wearable devices, and where insight module 1006 analyzes that data to generate one or more graphs 1008 that may be pushed to downstream constituents, where the stream of analytic recommendations contained within graphs 1008 may be subsequently used to provide "just-in-time" care of the individuals through the most cost-effective delivery means available.

Insight module 1006 is based upon a "Schema-on-Read" design, and highly leverages Graph Theory as its underlying data access layer. This coupling provides a number of advantages over prior art relational database oriented approaches that spend a lot of time and resources on defining a priori logical and physical schema to handle a finite set of business use cases. While this approach has traditionally worked well, it does not meet the demands of big and sparse data, and thereby limits the ability to distribute intelligence, insight and decision making across the cloud.

Platform 100 uses a graph-based approach, a branch of mathematics, which supports distribution of information across a dynamic computing technology, while supporting a dynamic working set of information. The traditional schema of the prior art database solutions is meaningless within platform 100. Platform 100 uses a set of dynamic data structures that are more readily adaptable to shifting business needs, thereby cutting costs in data modeling and database design. For example: health information is both sparse and dynamic. A health record for one individual may have a very different set of attributes as compared to a health record for another individual. Further, each health record changes over time; both as each individual's needs change, and as healthcare itself changes. Prior art relational models prove to be a challenging approach when dealing with this "sparse and dirty data" problem.

Within platform 100, insight module 1006 creates a graph 1008 formed of interconnected "nodes", where nodes represent data (e.g.: patients, health provider encounters, drugs, prescriptions, procedures, etc. . . . ) and the interconnections between the nodes represent relationships (e.g., patient "Fred" is prescribed Lisinopril). Both nodes and relationships are dynamic, being created and discarded as data is processed.

Since insight module 1006 uses graph 1008 to efficiently manage complex sets of relationships between data items, as compared to prior art use of relational databases, platform 100 avoids maintaining and traversing "join tables" (a standard design approach used to represent relationships in a traditional relational databases) and thereby provides a major performance increase to dramatically expand the types of analysis that be performed. Additionally, by using graphs, insight module 1006 processes queries much more efficiently—instead of "joining" the entire data set/table, insight module 1006 only traverses the relevant sub-graph.

Engage

As described above, platform 100 provides insight into data. Platform 100 allows that insight into the data to be converted into one or more actions using prescriptive analytics models that adapt to behavior patterns. Platform 100 allows behavior patterns that are constantly changing in small and large ways to instigate meaningful change. Within platform 100, intelligent models learn the why, how, when, and where behaviors may change to prompt optimal engagement.

Figure 11:
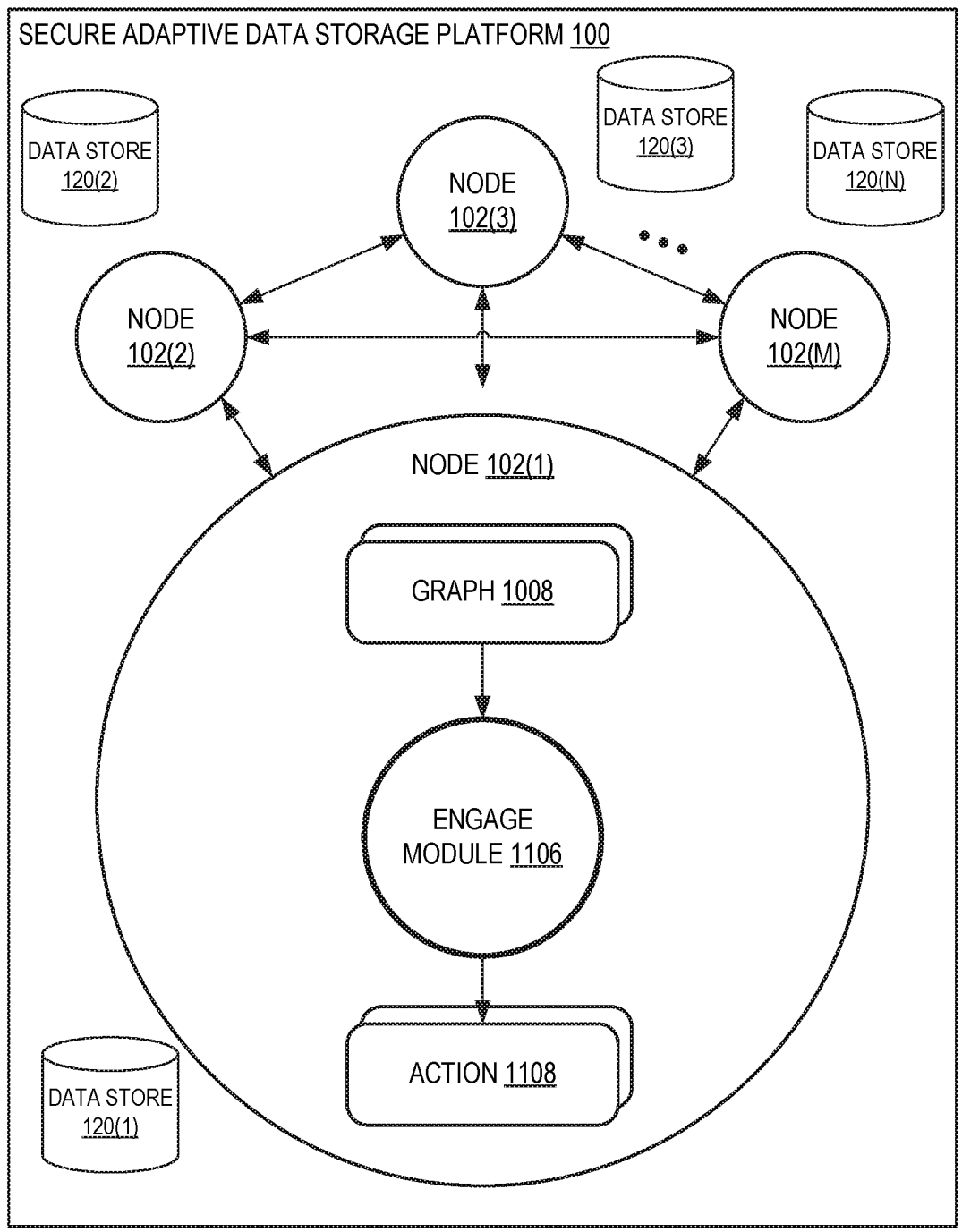
FIG. 11 shows the platform of FIG. 1 using an engage module 1106 within one node to interpret the graph of FIG. 10 and generate one or more actions, in an embodiment.

FIG. 11 shows platform 100 using an engage module 1106 within node 102(1) to interpret graph 1008 and generate one or more actions 1108. Engage module 1106 may be implemented within two or more nodes 102 of platform 100 that collectively operate together to provide the functionality of engage module 1106 as described herein. Engage module 1106 implements one or more prescriptive analytics models to interpret graph 1008 and generate human-centric action 1108. Action 1108 may take one of three forms.

First, action 1108 may provide a wide variety of traditional key performance indicators (KPIs), for example to solve a variety of asset utilization problems. While other systems may provide similar capability, platform 100 and engage module 1106 also provides a dynamic environment to apply a variety of "templates" for the creation of various predicative models including decision trees, logistic regression, neural networks, K-nearest neighbor, distance functions, Bayesian, and other numerical analysis methods.

Secondly, engage module 1106 may integrate with a wide variety of "eventing" platforms (event calendaring, collaboration, and such), to allow users to form ad hoc mechanisms to drive behavior of Digital Health. This mechanism allows engage module 1106 to create higher level capabilities, allowing providers to subtly shift the demand preference for services towards more cost-efficient provider platforms (e.g., imaging clinics). For example, platform 100 and engage module 1106 may "sense" the preferred mode of dialog with a particular patient (email, live person, social media messaging, and so on), and present back through the preferred mode a set of cost-effective options for elective diagnostic imaging.

Thirdly, engage module 1106 use immutable journal 108 as an underlying security mechanism. By creating a set of one-way hashes that authenticate back to common healthcare transactions (e.g.: office consult) and recording them within immutable journal 108, platform 100 creates a foundation for an entirely new ecosystem for value-based care. In short, platform 100 may provide a customized cryptocurrency that merges health transactional data with the underlying healthcare financial transaction. This model could have certain distinct advantages:

Adoption Acceleration—New types of services, such as telemedicine, could be more readily adopted by providing a built-in platform for provider reimbursement, breaking the current payer choke-hold.
  Float—Crypto money allows providers to be paid immediately upon providing service. No more waiting days/weeks/months for payment.
  Anonymity—Just like BitCoin, the patient-provider relationship remains completely anonymous.

Applications

Although Applications are not part of the internals of the Verified Data Set they are the main consumer of those VDS. Application developers may build directly on the Platform using a variety of protocols, REST, FHIR, SDK, CLI to name a few. Ecosystems have a distinct use-case and previously discussed. The Application stack may even be deployed and managed within platform 100. The applications may make direct use of the Verified Data Sets and/or access Ecosystems for data that enhances and supports their applications (Ecosystems are discussed further in the next section.)

Application Developers may leverage the platform-as-a-service and gain all the functionality described so far with little knowledge of databases, security, access or BlockChain. In fact, armed with the knowledge of REST, JSON, and Boolean logic, the application developer may create an application with security, ownership, consent, and analytics without the hassle and worry of those pieces, and thereby focus on delivering the next healthcare changing solution. Where armed with some knowledge of BI and data analytics, the data becomes alive with even greater power. The application developer may finally leverage data science to unlock its full potential.

Precision medicine methods create an enormous amount of data that must be maintained protected and used. Additionally, this data must be combined with other data, such as individual behaviors, social, economic, and environmental factors, to provide an end to end picture of one's health.

Individuals need to easily understand the meaning of their health data, collaborate with other individuals and their care providers, and apply it to their lives. The need is twofold. First, how can care providers use this information to assist the individual? Second, and more importantly, how can individuals use this data to proactively manage their health?

Through the creation of a Health Wallet, Individuals may be able to assemble information about themselves to create a Digital "You". The Health Wallet allows individuals to share this data with care providers, service providers, and applications without losing control of their data.

Secure Data Access and Interoperability

Secure data access and interoperability confound health organizations as well as individuals. Other industries, like financial services and telecommunications, not only simplify data access and standardization, they also develop and monetize new value-based business models that propelled those industries forward. Just as data is the currency for these industries, it becomes the currency within healthcare. Healthcare may catch up quickly by adopting new technologies that facilitate secure access and interoperability at scale.

Example of Use

Precision Medicine and Benefits

A distribution and delivery model for physician prescribed precision medicine benefits that facilitate wide scale adoption as part of an individual's wellness plan. Tests include: Toxicology—This test provides information about medication and other substances in an individual's system from either urine or oral samples; Psychiatry Profile—This tests provides information regarding the optimal psychotropic medication and dosage for an individual; Cancer Genomics—This test reveals abnormalities in an individual's genes that drive the development and growth of many types of cancers; Woman's Health Profile—This test identifies microorganisms including bacteria, fungi, and viruses and quantify them as pathogenic and non-pathogenic; and Pharmacogenomics—This test enhances overall drug safety by helping a provider prescribed the right medication based on an analysis of an individual's DNA.

Initially, the panel of tests may be bundled with a comprehensive Employer/Employee benefit package that includes telehealth consults, additional lab panels, and the creation of an individual Health Wallet to provide long term access to the test results.

Platform 100 revolutionizes access to health data by solving its transparency and security problems. The secure BlockChain-based intelligent data grid connects to any data stream with sleek FHIR-compliant APIs and provides the capability to quickly share information and implement digital health innovations.

Society seeks to redefine our understanding of disease onset and progression, treatment response, and health outcomes through the more precise measurement of molecular, environmental, and behavioral factors that contribute to health and disease. This understanding may lead to more accurate diagnoses, more rational disease prevention strategies, better treatment selection, and the development of new care paths. Foundational to the success of these efforts are the ability to collect, protect, and analyze longitudinal data collected from individuals over a multi-year period. According to clinicaltrials.gov, there are over 245,000 active clinical trials underway. However, they are highly concentrated in certain locations.

Platform 100 allows a researcher to create an initiative, solicit funding, intelligently identify potential participants and solicit their participation without compromising the individual's anonymity, and engage with an individual to participate in the study through smart consent contracts. Platform 100 allows researchers to actively connect with individuals throughout the world and extend research footprint to underserved geographic areas.

IN SUMMARY

Platform 100 provides a series of layered and embedded techniques to create a multi-level trust capability. When all security levels are deployed in concert, platform 100 provides a highly secure operating and data environment that: protects the data, maintains the integrity of the data, and secures the environment where the data lives.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A node of an adaptive data storage platform, comprising:
   a processor;
   a memory communicably coupled with the processor;
   a network interface, communicably coupled with the processor, for communicating with a plurality of external nodes of the adaptive storage platform;
   a consensus trust module implemented as machine-readable instructions that are stored in the memory and, when executed by the processor, control the node to:
      receive a request to add new data to a distributed ledger stored in the adaptive data storage platform,
      construct, based on the new data, a new block having a hash value,
      distribute the new block to the plurality of external nodes,
      receive one of a plurality of votes from each of at least some of the plurality of external nodes, distribute, based on a majority of the plurality of votes, the hash value to the plurality of external nodes to indicate that the new block is added to the distributed ledger; and a data cloaking module implemented as machine-readable instructions that are stored in memory and, when executed by the processor, control the node to:
encrypt the new block to create an encrypted block, shard the encrypted block into a plurality of new shards, and
move at least one of the plurality of new shards to an external node, of the plurality of external nodes, for storage in a corresponding data store of the external node,
and wherein said consensus trust model includes additional machine-readable instructions that are stored in the memory and, when executed by the processor, control the node to:
receive, from an external node, an external query and external block identifier,
search a local data store to identify one or more previously stored shards that match the external block identifier, and
transmit the one or more previously stored shards to the external node.

2. The node of claim 1, the data cloaking module including additional machine-readable instructions that are stored in the memory and, when executed by the processor, control the node to randomly select the external node from the plurality of external nodes.

3. The node of claim 1, the data cloaking module including additional machine-readable instructions that are stored in the memory and, when executed by the processor, control the node to:
receive a query to retrieve existing data from an existing block of the distributed ledger, the existing block having a block identifier,
broadcast the query and block identifier to the plurality of external nodes,
receive, from at least one of the plurality of external nodes, at least one of a plurality of existing shards forming the existing block,
reconstruct the existing block from the plurality of existing shards,
decrypt the existing block to obtain the existing data, and output the existing data.

4. The node of claim 1, wherein:
the data cloaking module includes additional machine-readable instructions that are stored in the memory and, when executed by the processor, control the node to store at least one of the plurality of new shards in the local data store.

5. The node of claim 1, the consensus trust module including additional machine-readable instructions that are stored in the memory and, when executed by the processor, control the node to:
receive, from an external node of the plurality of external nodes, an externally-generated block,
generate a new vote based on the externally-generated block and a most-recent hash value of the distributed ledger that is stored in the memory,
transmit the new vote to the external node,
receive, from the external node, a new hash value indicating that the externally-generated block is added to the distributed ledger, and update the most-recent hash value to equal the new hash value.

6. The node of claim 5, wherein the machine-readable instructions that, when executed by the processor, control the node to generate a new vote include machine-readable instructions that, when executed by the processor, control the node to generate the new vote based on a modified proof-of-stake algorithm.

7. The node of claim 1, wherein:
the consensus trust module including additional machine-readable instructions that are stored in the memory and, when executed by the processor, control the node to:
receive an external shard from an external node, and store the external shard in the local data store.

8. The node of claim 1, wherein:
the consensus trust module including additional machine-readable instructions that are stored in the memory and, when executed by the processor, control the node to:
transmit a shard stored in the local data store to an external node for storage in its corresponding data store, and
delete the shard in the local data store.

9. An adaptive data storage platform, comprising:
a plurality of nodes, each of said nodes comprising:
a processor;
a memory communicably coupled with the processor;
a network interface, communicably coupled with the processor, for communicating with a plurality of external nodes of the adaptive storage platform;
a consensus trust module implemented as machine-readable instructions that are stored in the memory and, when executed by the processor, control the node to:
receive a request to add new data to a distributed ledger stored in the adaptive data storage platform,
construct, based on the new data, a new block having a hash value,
distribute the new block to the plurality of external nodes,
receive one of a plurality of votes from each of at least some of the plurality of external nodes,
distribute, based on a majority of the plurality of votes, the hash value to the plurality of external nodes to indicate that the new block is added to the distributed ledger;
and
a data cloaking module implemented as machine-readable instructions that are stored in memory and, when executed by the processor, controls the node to:
encrypt the new block to create an encrypted block, shard the encrypted block into a plurality of new shards, and
move at least one of the plurality of new shards to an external node, of the
plurality of external nodes, for storage in a corresponding data store of the
external node,
and wherein said consensus trust model includes additional machine-readable instructions that are stored in the memory and, when executed by the processor, control the node to:
receive, from an external node, an external query and external block identifier,
search a local data store to identify one or more previously stored shards that match the external block identifier, and
transmit the one or more previously stored shards to the external node.

10. A method for adaptive data storage, comprising:
receiving, by a node of an adaptive data storage platform, a request to add new data to a distributed ledger stored in the adaptive data storage platform;
constructing, based on the new data, a new block having a hash value;
distributing the new block to a plurality of external nodes of the adaptive data storage platform;
receiving one of a plurality of votes from each of at least some of the plurality of external nodes;
distributing, based on a majority of the plurality of votes, the hash value to the plurality of external nodes to indicate that the new block is added to the distributed ledger;
encrypting the new block to create an encrypted block;
sharding the encrypted block into a plurality of new shards; and
moving at least one of the plurality of new shards to an external node, of the plurality of external nodes, for storage in a corresponding data store of the external node,
receiving, from an external node of the adaptive data storage platform, an external query and external block identifier;
searching a local data store of the node to identify one or more previously stored shards that match the external block identifier; and
transmitting the one or more previously stored shards to the external node.

11. The method of claim 10, further comprising randomly selecting the external node from the plurality of external nodes.

12. The method of claim 10, further comprising:
receiving a query to retrieve existing data from an existing block of the distributed ledger, the existing block having a block identifier;
broadcasting the query and block identifier to the plurality of external nodes;
receiving, from at least one of the plurality of external nodes, at least one of a plurality of existing shards forming the existing block;
reconstructing the existing block from the plurality of existing shards;
decrypting the existing block to obtain the existing data; and
outputting the existing data.

13. The method of claim 10, further comprising storing at least one of the plurality of new shards in the local data store of the node.

14. The method of claim 10, further comprising:
receiving, from an external node of the plurality of external nodes, an externally-generated block;
generating a new vote based on the externally-generated block and a most-recent hash value of the distributed ledger that is stored in a memory of the node;
transmitting the new vote to the external node;
receiving, from the external node, a new hash value indicating that the externally-generated block is added to the distributed ledger; and
updating the most-recent hash value to equal the new hash value.

15. The method of claim 14, wherein said generating the new vote is based on a modified proof-of-stake algorithm.

16. The method of claim 10, further comprising:
transmitting a shard stored in the local data store to an external node for storage in the corresponding data store of the external node; and
deleting the shard in the local data store.

* * * * *